United States Patent
Lawton et al.

(10) Patent No.: US 8,825,514 B2
(45) Date of Patent: *Sep. 2, 2014

(54) SYSTEM AND METHOD FOR ESTIMATING RESIDUAL LIFETIME VALUE OF A CUSTOMER BASE UTILIZING SURVIVAL ANALYSIS

(71) Applicant: Branch Banking and Trust Company, Raleigh, NC (US)

(72) Inventors: Robert Russell Lawton, Madison, NC (US); Guenther Kurt Hartfeil, Cornelius, NC (US)

(73) Assignee: Branch Banking and Trust Company, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,874

(22) Filed: May 14, 2013

(65) Prior Publication Data

US 2013/0253983 A1 Sep. 26, 2013

Related U.S. Application Data

(60) Continuation of application No. 13/706,512, filed on Dec. 6, 2012, now Pat. No. 8,442,854, which is a division of application No. 13/187,742, filed on Jul. 21, 2011, now Pat. No. 8,504,409.

(60) Provisional application No. 61/366,402, filed on Jul. 21, 2010.

(51) Int. Cl.
*G06Q 10/00* (2012.01)
*G06Q 30/00* (2012.01)

(52) U.S. Cl.
USPC .......................................................... 705/7.29

(58) Field of Classification Search
USPC .......................................................... 705/7.29
See application file for complete search history.

(56) References Cited

U.S. PATENT DOCUMENTS

| | | | |
|---|---|---|---|
| 7,136,448 B1 * | 11/2006 | Venkataperumal et al. | 379/265.02 |
| 7,340,408 B1 * | 3/2008 | Drew et al. | 705/7.33 |
| 7,526,434 B2 * | 4/2009 | Sharp | 705/7.29 |
| 7,698,163 B2 * | 4/2010 | Reed et al. | 705/7.33 |
| 7,707,059 B2 * | 4/2010 | Reed et al. | 705/7.31 |
| 7,752,100 B1 * | 7/2010 | Wasserman et al. | 705/35 |
| 7,827,183 B2 | 11/2010 | Fraser et al. | |
| 7,835,958 B1 * | 11/2010 | Redweik | 705/35 |
| 7,835,959 B1 * | 11/2010 | Redweik | 705/35 |
| 7,844,515 B1 * | 11/2010 | Redweik | 705/35 |

(Continued)

OTHER PUBLICATIONS

Rosset, S. et al., Customer Lifetime Value Models for Decision Support Data Mining and Knowledge Discovery, vol. 7, 2003, pp. 321-339.

(Continued)

*Primary Examiner* — Scott L Jarrett
(74) *Attorney, Agent, or Firm* — Duane Morris LLP

(57) ABSTRACT

The present disclosure describes novel systems and methods that can be utilized to evaluate and/or direct an interaction with a consumer database and/or evaluate a consumer database, where the consumer database contains information about consumers and particular products and/or services held or used by the consumers. The interactions may be, for example, determining a strategy for sales, marketing, cross-selling, and/or retaining one or more of the consumers. The evaluations may include, for example, hierarchically ranking the consumers and/or determining a clustering of the consumers.

26 Claims, 15 Drawing Sheets

(56) References Cited

U.S. PATENT DOCUMENTS

| | | | |
|---|---|---|---|
| 7,844,516 B1 | 11/2010 | Redweik | |
| 7,844,526 B1* | 11/2010 | Redweik | 705/36 R |
| 8,214,308 B2* | 7/2012 | Chu | 706/14 |
| 8,306,850 B2* | 11/2012 | Lawton et al. | 705/7.33 |
| 8,428,997 B2* | 4/2013 | Maga et al. | 705/7.29 |
| 8,442,854 B2* | 5/2013 | Lawton et al. | 705/7.29 |
| 8,473,328 B2* | 6/2013 | Lawton et al. | 705/7.33 |
| 8,504,409 B2* | 8/2013 | Lawton et al. | 705/7.29 |
| 2003/0200135 A1* | 10/2003 | Wright | 705/10 |
| 2004/0103051 A1* | 5/2004 | Reed et al. | 705/36 |
| 2007/0118419 A1* | 5/2007 | Maga et al. | 705/10 |
| 2007/0124237 A1* | 5/2007 | Sundararajan et al. | 705/38 |
| 2007/0156673 A1* | 7/2007 | Maga et al. | 707/5 |
| 2007/0185867 A1* | 8/2007 | Maga et al. | 707/6 |
| 2009/0292583 A1* | 11/2009 | Eilam et al. | 705/10 |
| 2011/0251874 A1* | 10/2011 | Banthia et al. | 705/7.31 |
| 2012/0022917 A1 | 1/2012 | Lawton et al. | |

OTHER PUBLICATIONS

Zhang, H., Customer Retention in the Financial Industry: An Application of Survival Analysis Purdue University, Jun. 17, 2008, pp. 1-126.

Harvey, J. et al., Customer Profitability Analysis CIMA, Topic Gateway Series No. 55, Jan. 2009, 11pgs.

Steffes, E.M., Establishing the Link Between Relationship Marketing, Customer Profitability and Customer Lifetime The University of Texas at Dallas, Aug. 2005, pp. 1-182.

Customer Profitability Analysis—Good Practice Guideline No. 37 The Institute of Chartered Accounts, Faculty of Finance and Management, Mar. 2002, pp. 1-36.

Gilleland, J. et al., Consider All the Variables: How to Nurture High-Profit and High Potential Customers Chief Marketer, Aug./Sep. 2009, 2pgs.

Kumar, V., Chapter 29, Customer Lifetime Value University of Connecticut, 2005, pp. 1-55.

Venkatesan, R. et al., A Customer Lifetime Value Framework for Customer Selection and Resource Allocation Strategy Journal of Marketing, vol. 68, Oct. 2004, pp. 106-125.

Borle, S. et al., Customer Lifetime Value Measurement Management Science, vol. 54, No, 1, Jan. 2008, pp. 100-112.

Van Raaij, E.M. et al., The Implementation of Customer Profitability Analysis: A Case Study Industrial Marketing Management, vol. 32, 2003, pp. 573-583.

Gupta, S. et al., Modeling Customer Lifetime Value Journal of Service Research, vol. 9, No. 2, Nov. 2006, pp. 139-155.

Paauwe, P. et al., DTMC: An Actionable E-Customer Lifetime Value Model Based in Markov Chains and Decision Trees ICE'07, ACM, Aug. 19-22, 2007, 9pgs.

James, D. et al., Targeting Customer with Statistical and Data-Mining Techniques Journal of Service Research, vol. 3, No. 3, Feb. 2001, pp. 205-219.

Baesens, B. et al, Neural Network Survival Analysis for Personal Load Data Journal of Operations Research Society, vol. 56, 2006, pp. 1089-1098.

Reid, R., Teradata Helps Carriers Corral Customers Network World Canada, vol. 13, No. 8, Apr. 18, 2003, 2pgs.

Haenlein, M. et al., A Model to Determine Customer Lifetime Value in a Retail Banking Context European Management Journal, vol. 25, No. 3, 2007, pp. 221-234.

Barak, L. et al., Toward an Individual CustomerProfitability Mobile: A Segment-Based Approach Journal of Service Research, vol. 5, No. 1, Aug. 2002, pp. 69-76.

* cited by examiner

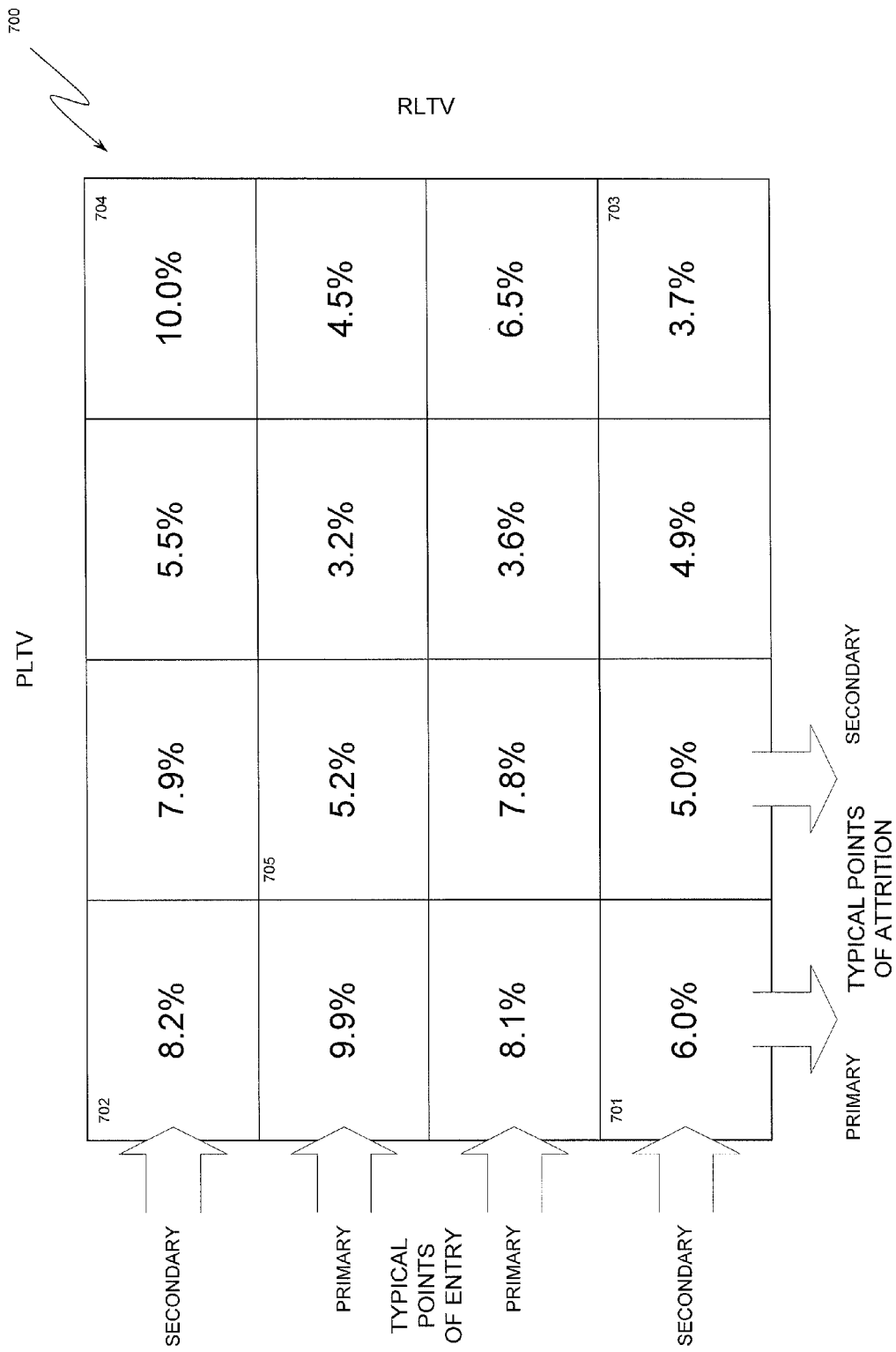

SYSTEM AND METHOD FOR ESTIMATING RESIDUAL LIFETIME VALUE OF A CUSTOMER BASE UTILIZING SURVIVAL ANALYSIS

RELATED AND CO-PENDING APPLICATIONS

This application is a continuation of and claims priority to co-pending U.S. application entitled "System and Method for Estimating Residual Lifetime Value of a Customer Base Utilizing Survival Analysis", Ser. No. 13/706,512, filed 6 Dec. 2012, which is a divisional application of and claims priority to U.S. application entitled "System and Method for Evaluating Banking Consumers as a Function of Aggregated Residual Lifetime Values and Potential Lifetime Values" Ser. No. 13/187,742, filed 21 Jul. 2011, which claims priority to U.S. provisional application entitled "System and Method for Analyzing Client Base Value", Ser. No. 61/366,402 filed 21 Jul. 2010, all of which are hereby incorporated herein by reference in their entirety.

BACKGROUND

Most organizations, in particular large organizations with a significant client/consumer base, are constantly faced with the problem of maximizing the value they can extract from their clients/consumers while minimizing the cost in doing so. Preferably, the organization would like to institute one or more programs that are both effective at targeting the clients' needs while efficiently applying a limited amount of resources (e.g., money, time, and effort). However, typical client bases are made up of disparate individuals/entities that have widely varying behaviors, attitudes, and needs and may further have varying propensities for obtaining new products and/or services from the organization.

Typically, most prior art systems and methods address the issue of how to model the needs/desires of their client/consumer base from a product-oriented approach rather than a client-oriented approach. For example, traditional sales models focus on selling a particular product and then determine which clients, or an approximation of a "typical client", are most likely to purchase that particular product. Such an approach directs interactions with the clients towards a sales call or marketing effort that is focused on the particular product first and glosses over the attitudes, desires, and needs of the clients. These prior art approaches typically results in relatively low sales rates (e.g., 2% direct mail response) since there is no real effort made by the organization to determine what the client wants.

Some prior art approaches may attempt to take the client's needs into account, but still these approaches retain the focus on what the organization wants, i.e., the product to be sold. One reason for this is that even the most robust client and product database has limited information about the client and this dearth of client information makes it difficult, if not impossible, to distinguish clients who may appear to be similar but in actuality have widely varying attitudes, behaviors, and needs.

At best, prior art systems and methods cannot achieve the necessary granularity of analysis in order to direct how the organization should interact with the various needs and concerns of its clients. Consequently, prior art systems and methods may only target a vaguely-determined "median person" or "median behavior" or "the average Joe" or some other gross characterization of the client base. In some instances, prior art systems and methods may target a very limited number of groups, e.g., "the average Joe" and "the average Jane", and perhaps "the average Jim". Such prior art systems and methods operate under the assumption that "the average Joe/Jane/Jim" is a sufficient indicator of how most of the client base will act and the organization will conduct itself accordingly when interacting with each client/consumer in the client base. Obviously, lumping everyone in one basket in a "one size fits all" approach or even into a few baskets is not an effective means of dealing with a client/consumer base made up of distinct, and perhaps contrasting, individuals and behaviors.

For example, prior art systems and methods which direct how an organization should interact with its clients using "the average Joe" approach are most likely to determine a single sales strategy and/or marketing strategy and/or cross-selling strategy, and/or consumer retention strategy and apply that single strategy to every consumer regardless of whether a particular consumer is even interested in, e.g., new sales, or a cross-sell product or service. Additionally, "the average Joe" approach may result in a uniformly-applied evaluation of an attrition probability of a product held by a consumer, or may uniformly include or exclude a consumer from a future product offering which may completely mismanage a consumer's needs and therefore may actually push the consumer out the door and into the arms of a waiting competitor. Furthermore, "the average Joe" approach is wholly inadequate for hierarchically ranking the consumers, and/or determining a clustering of the consumers.

The present disclosure provides for novel systems and computerized methods to be used by an organization (including, without limitation, a bank or financial institution) to overcome the above-described deficiencies in the prior art. Embodiments of these methods include, for example, viewing the clients in the database against all of the relevant products/services thereby capturing a more complete understanding of the client/product environment allowing for directing improved interactions with the clients. In certain embodiments, there are five main points that may be taken into account: (1) each client may be viewed from two perspectives, (a) the current product mix of products/services that the client has/uses, and (b) one or more potential future product mix of products/services; (2) each of the product mixes may be assigned a value; (3) a difference between a current and a potential future product mix may lead to multiple product recommendations for a client versus the traditional single product recommendation based on prior art models; (4) a matrix of current values versus a potential values may be determined and analyzed to thereby direct future interactions with the client(s); and (5) a client's movement over time through the matrix may be tracked to thereby determine patterns applicable to that client. Embodiments described herein may be applied to a cluster or segment of clients who are sufficiently alike to one another and dissimilar to other clients/clusters/segments.

Accordingly, it is an object of the present disclosure to provide a method for directing an interaction with at least a first consumer and/or evaluating a consumer database, where the method may include providing a computer database comprising first information about plural consumers and second information about predetermined products, wherein the plural consumers include the first consumer, and wherein each of the plural consumers is associated with a current product mix comprising certain ones of the predetermined products independent of an association of another consumer with the predetermined products. Additionally, the method may calculate, using a computer processor, individually for each one of the plural consumers, (i) an aggregate first Residual Life Time Value ("RLTV") estimate from the time variable products in the current product mix for said one consumer; (ii) an aggregate second RLTV estimate from the finite duration products in the current product mix for said one consumer; (iii) an aggregate third RLTV estimate from the aggregate first RLTV estimate and from the aggregate second RLTV estimate; and (iv) an aggregate PLTV estimate from preselected products not in the current product mix for said one consumer. Furthermore, the method may: calculate, using a processor, the likelihood of the first consumer to acquire one or more of the predetermined products not in the current product mix for the first consumer; analyze a distribution of the aggregate third RLTV estimates for the plural consumers; analyze a distribution of the aggregate PLTV estimates for the plural consumers; evaluate the first consumer as a function of the distribution of the third aggregate RLTV estimates and as a function of the distribution of the aggregate PLTV estimates; and interact with the first consumer based on said evaluation of the first consumer.

Additionally, the above method may further include stratifying the database into plural segments according to a predetermined criteria, and wherein each of the plural consumers may be assigned to one of the plural segments according to the predetermined criteria.

Further, the above method may include determining a matrix of values from the distribution of the aggregate third RLTV estimates for the plural consumers and from the distribution of the aggregate PLTV estimates for the plural consumers; wherein the matrix may have N number of rows encompassing a first range of quantities for the distribution of the aggregate third RLTV estimates and may have M number of columns encompassing a second range of quantities for the distribution of the aggregate PLTV estimates thereby creating a matrix of X cells where X=N*M (where M may be greater than, less than, or equal to N).

Still further, the above method may assign the first consumer to one of the X cells based at least in part on the evaluation of the first consumer.

Yet further, the above method may determine an interaction with the first consumer based at least in part on the cell assignment.

Even further, the above method may assign the first consumer to one of the X cells based at least in part on a recalculated aggregate third RLTV estimate and a recalculated aggregate PLTV estimate.

Even still further, the above method may determine the interaction with the first consumer based at least in part on a difference between the cell assignment of the first consumer based at least in part on the aggregate third RLTV estimate for the first consumer and the aggregate PLTV estimate for the first consumer and the cell assignment of the first consumer based at least in part on the recalculated aggregate third RLTV estimate and the recalculated aggregate PLTV estimate.

It is another object of the present disclosure to provide a system for evaluating a first consumer, including: a computer database comprising first information about plural consumers and second information about predetermined products, wherein the plural consumers include the first consumer, and wherein each of the plural consumers is associated with a current product mix comprising certain ones of the predetermined products independent of an association of another consumer with the predetermined products; a computer processor; and a computer readable storage medium comprising computer-executable instructions stored thereon, said instructions when executed causing said processor to: (1) individually for each one of the plural consumers: (i) calculate an aggregate first Residual Life Time Value ("RLTV") estimate from the time variable products in the current product mix for said one consumer, (ii) calculate an aggregate second RLTV estimate from the finite duration products in the current product mix for said one consumer, (iii) calculate an aggregate third RLTV estimate from the aggregate first RLTV estimate and from the aggregate second RLTV estimate, and (iv) calculate an aggregate PLTV estimate from preselected products not in the current product mix for said one consumer; and to (2) calculate the likelihood of the first consumer to acquire one or more of the predetermined products not in the current product mix for the first consumer; (3) analyze a distribution of the aggregate third RLTV estimates for the plural consumers; (4) analyze a distribution of the aggregate PLTV estimates for the plural consumers; and (5) evaluate the first consumer as a function of the distribution of the third aggregate RLTV estimates and as a function of the distribution of the aggregate PLTV estimates.

It is yet another object of the present disclosure to provide a method for directing an interaction with at least a first consumer, the method may include providing a computer database which contains first information about plural consumers and second information about predetermined products, wherein the plural consumers include the first consumer, and wherein each of the plural consumers is associated with a current product mix comprising certain ones of the predetermined products independent of an association of another consumer with the predetermined products; and for a time variable product in the current product mix for a one of the plural consumers: (i) determining a baseline product survival curve, (ii) determining a shift in the baseline product survival curve as a function of characteristics of said one consumer to thereby determine a consumer product survival curve, (iii) calculating, using a processor, an area under the consumer product survival curve, (iv) calculating, using a processor, an estimated potential residual profit from the calculated area, (v) determining a first Residual Life Time Value ("RLTV") estimate for said time variable product for said one consumer from the calculated estimated potential residual profit, (vi) repeating (i) through (v) for each time variable product in the current product mix for said one consumer, and (vii) determining an aggregate first RLTV estimate for said one consumer from the first RLTV estimate for each said time variable product for said one consumer; the foregoing may be repeated for each one of the plural consumers.

Additionally, the method may include, for a finite duration product in the current product mix for a one of the plural consumers: (i) determining a remaining outstanding balance (as an example, since this may apply to any monetary amount such as purchases made during a time period, or a price), (ii) multiplying, using a processor, the remaining outstanding balance by a funds transfer pricing value for said finite duration product to thereby determine an approximate residual value, (iii) determining a second RLTV estimate for said finite duration product for said one consumer from the approximate residual value, (iv) repeating (i) through (iii) for each finite duration product in the current product mix for said one consumer, and (v) determining an aggregate second RLTV estimate for said one consumer from the second RLTV estimate for each said finite duration product for said one consumer; the foregoing may be repeated for each one of the plural consumers.

Further, the method may include, individually for each of the plural consumers, determining an aggregate third RLTV estimate from that consumer's aggregate first RLTV estimate and from that consumer's aggregate second RLTV estimate; and calculating, using a processor, the likelihood of the first consumer to acquire one or more of the predetermined products not in the current product mix for the first consumer.

Still further, the method may include, for a preselected product not in the current product mix of a one of the plural consumers: (i) determining a baseline product survival curve, (ii) calculating, using a processor, an area under the baseline product survival curve, (iii) calculating, using a processor, an estimated potential residual profit from the calculated area, (iv) determining a Potential Life Time Value ("PLTV") estimate for said preselected product for said one consumer from the calculated area, (v) repeating (i) through (iv) for each preselected product not in the current product mix for said one consumer, and (vi) determining an aggregate PLTV estimate for said one consumer from the PLTV estimate for each said preselected product for said one consumer; the foregoing may be repeated for each one of the plural consumers.

Yet further, the method may include analyzing a distribution of the aggregate third RLTV estimates for the plural consumers; analyzing a distribution of the aggregate PLTV estimates for the plural consumers; evaluating the first consumer as a function of the distribution of the third aggregate RLTV estimates and as a function of the distribution of the aggregate PLTV estimates; and interacting with the first consumer based on said evaluation of the first consumer.

The above advantages, as well as many other advantages, of the present disclosure will be readily apparent to one skilled in the art to which the disclosure pertains from a perusal of the claims, the appended drawings, and the following detailed description.

BRIEF DESCRIPTION OF THE DRAWINGS

FIG. 7 is a depiction of an exemplary matrix of Residual Life Time Value ("RLTV") estimates and Potential Life Time Value ("PLTV") estimates including an exemplary distribution of consumers and showing typical points of entry and typical points of attrition for one or more consumers according to an embodiment of the disclosure.

DETAILED DESCRIPTION

Figure 1:
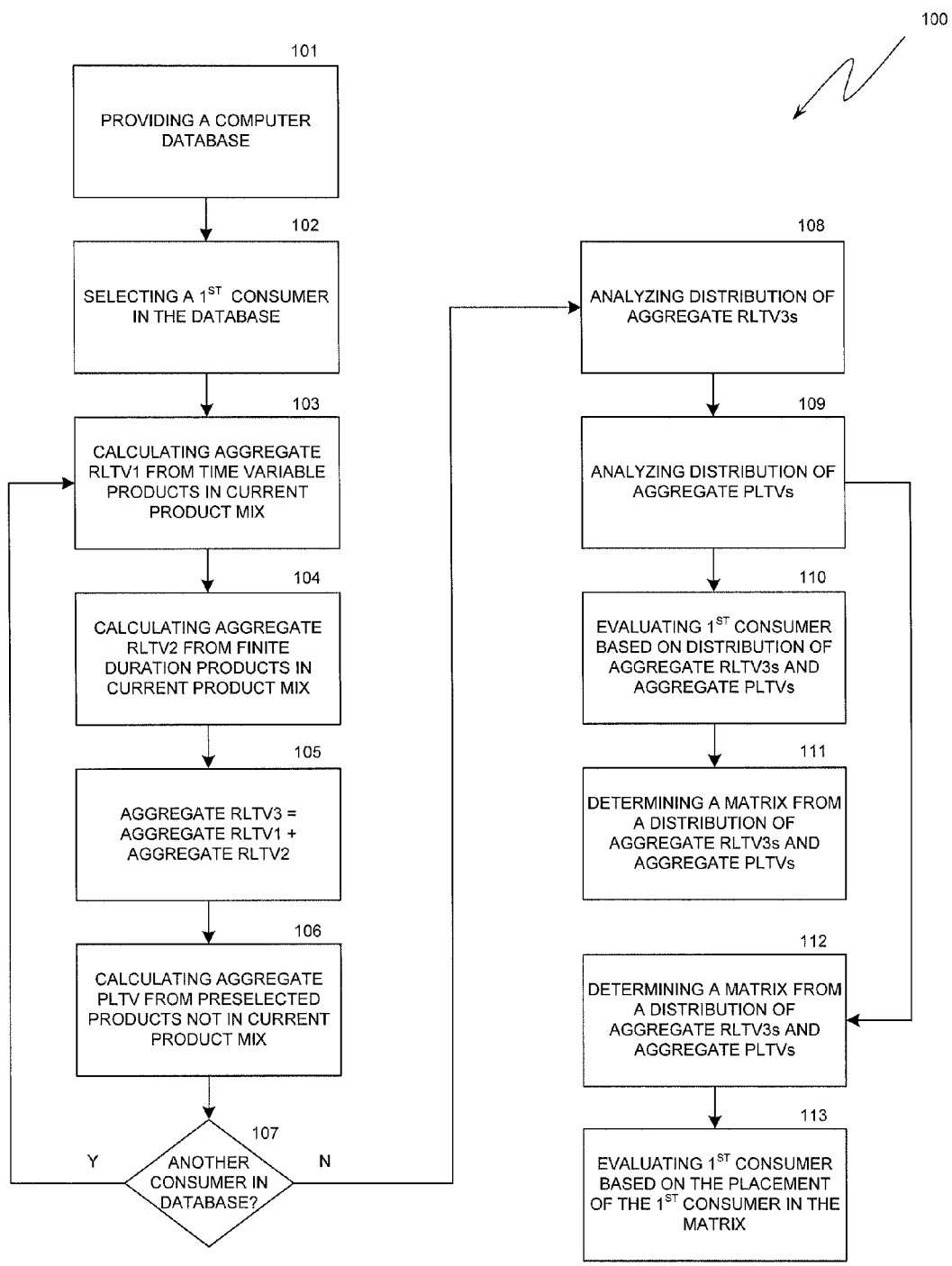
FIG. 1 is a flow diagram for a method of evaluating/strategizing interactions with a client base according to an embodiment of the disclosure.

As described below, the present disclosure provides for novel systems and methods for capturing a more complete understanding of the client/product environment thereby allowing for directing improved interactions with the clients. Such inventive systems and methods would be useful, for example, for an organization (including, without limitation, a bank or financial institution) to direct or determine a strategy for sales, marketing, cross-selling, and/or retaining one or more of the consumers. Additionally, the organization could make use of the inventive systems and methods in order to evaluate attrition probability of a product held by a consumer, exclude a consumer from a future product offering, hierarchically rank the organization's consumers, and/or determine a clustering of the consumers to assist in other analyses.

Embodiments discussed herein may be referred to as the Lifetime Value ("LTV") model and the outputs of the LTV model may be used, for instance, by a sales and/or marketing division within an organization to more efficiently and effectively service current consumers by directing their consumer interaction efforts where returns will be maximized The LTV model may incorporate mathematical concepts, economic and behavioral information of consumers, demographic and/or socio-economic information, and, in some embodiments, sales and marketing concepts which may be used to obtain a matrix of information about the consumers in an organization's database and where a particular consumer may be placed in that matrix. The output of the LTV model may be used to direct one or more future interactions with a particular consumer or consumers to, for instance, maximize that consumer's value to the organization as well as providing products and services to the consumer to maximize that consumer's satisfaction and/or predict which products/services that consumer may most want or need. As a non-limiting example, the LTV model may be used to hierarchically rank a database of current consumers with respect to the consumers' current value to the organization as well as the consumers' future potential value to the organization. The LTV may make use of a highly integrated system and method, as described herein, which includes various mathematically generated algorithms resulting in a series of consumer metrics previously unknown to the organization. These new metrics may be used strategically or tactically in directing interactions with one or more of the consumers in the database. These metrics include, but are not limited to: (a) a current lifetime value of a particular consumer to the organization which may be based on that particular consumer's product/service portfolio as it currently exists (sometimes referred to herein as a "current product mix"; where the current product mix may include products and/or services); (b) an expected future lifetime value which may be based upon modeled expectations that are a function of the currently held products/services, demographics, and/or socio-economic factors; (c) a composite lifetime value that may be used to hierarchically rank consumers; (d) a "next three most likely service" enrollment hierarchy for a consumer based on the output of the LTV model; (e) a clustering model which enables the clustering of similarly-behaving consumers based on the consumers' behaviors specific to their interactions with the organization, and (f) a life cycle tracking capability to enable the organization to track the life cycle of a given consumer or group of consumers across time. Such life cycle tracking provides important information regarding interactions between the organization and its consumers including longer term future consumer value, cross-sell and up-sell opportunities, attrition abatement, as well as other factors.

While the present description of the inventive embodiments may be directed towards a particular scenario for ease of explanation, such as a banking/financial transaction scenario, one of skill in the art will understand that the inventive embodiments are not so limited and have application in other scenarios. For example, a current product mix that an organization in the banking industry may be interested in may include a checking account (perhaps different types of checking accounts are treated separately), savings account, and a credit card. A current product mix that an organization in the consumer products industry may be interested in may include a lawn mower, hand tools, power tools, ladders, garden upkeep service, and personal safety equipment. Additionally, while the description may in certain instances recite "products", it will be understood by those of skill in the art that, where appropriate, "products" shall mean both products and services.

With attention directed towards FIG. 1 a flow diagram 100 is shown for a method of directing/strategizing interactions with a client base according to an embodiment of the disclosure. At step 101, a computer database provided, such as the database shown in box 201A in FIG. 2. The computer database may include information on each of the consumers that currently have products and/or use services provided by an organization as well as information about the particular products/services that are in the consumer's current product mix. The products/services may include, but are not limited to, demand deposit account ("DDA"), personal savings account ("PSV"), credit card ("CCD"), direct loan, indirect loan, line of credit, certificate of deposit, individual retirement account, mortgage, wire transfer, investments, etc. The database may further include such information as: consumer products owned/purchased; purchase, return, or expiration dates of the products/services; transaction data (e.g., if/when a return is made, if/when a deposit is made); other product/service data (e.g., balances, size, losses, term); channel data (e.g., store, website, service usage); consumer demographics (e.g., age, income, socio-economic data); firmagraphics (e.g., North American Industry Classification System code, sales size); purchased client demand estimates; segment categorizations for the consumers; revenue drivers (e.g., product price, margins, fees); cost drivers (e.g., variable product or service costs); attrition history and/or estimates on a product-by-product basis); consumer contact response data; consumer strategy data; and other information that may be useful to use in the LTV model.

The database may have previously been analyzed and statistically evaluated for particular products of interest at the product level, for example, DDA, PSV, and CCD products. Additionally, the consumers in the database may be stratified into multiple groups where each of the groups have similar statistical characteristics. The product evaluation for a consumer may include utilizing the entire sub-populations of a particular group and may result in, for example, one or more of the following statistical results: sample size, average of a series of time unit (e.g., twelve month) averages, standard deviation, skewness, kurtosis, and percentiles (e.g., $25^{th}$ percentile, $50^{th}$ percentile (the median), $75^{th}$ percentile, $95^{th}$ percentile, etc.). The stratification of the consumers into multiple consumer groups may be accomplished for any desired number of groups, such as four groups, so long as the members of the groups have similar statistical characteristics. These particular groups may include, for example, a "core client" group, a "top core client" group, an "affluent client" group, and an "ultra high net worth client" group. As a non-limiting example, approximately 90% of the consumers in the database may belong to the "core client" group with diminishing percentages for the other groups (e.g., approximately 5% for the "top core client" group; approximately 3% for the "affluent client" group, and approximately 2% for the "ultra high net worth client" group).

At step 102, a first consumer in the database may be selected. At step 103, an aggregate first Residual Life Time Value ("RLTV") estimate, referred to as "aggregate RLTV1" in step 103 of FIG. 1, may be calculated from the time variable products (each one separately) in the current product mix for the first consumer chosen in step 102. The processor 201B in FIG. 2 may be used for this calculation. Time variable products may include, for example, DDA, PSV, and CCD products. For example, if the first consumer only has DDA and CCD products, then only information related to those products would be used for determining the aggregate RLTV1. The calculation of RLTV estimates will be discussed further below with respect to FIG. 3.

At step 104, an aggregate second RLTV estimate, referred to as "aggregate RLTV2" in step 104 of FIG. 1, may be calculated from the finite duration products (each one separately) in the current product mix for the first consumer chosen in step 102. The processor 201B in FIG. 2 may be used for this calculation. Finite duration products may include, for example, direct loans and indirect loans. For example, if the first consumer only has an indirect loan, then only information related to the indirect loan would be used for determining the aggregate RLTV2. The calculation of the RLTV estimates will be discussed further below with respect to FIG. 3.

At step 105, an aggregate third RLTV estimate, referred to as "aggregate RLTV3" in step 105 of FIG. 1, may be calculated from the aggregate RLTV1 and aggregate RLTV2 estimates. The aggregate RLTV3 may be the sum of the aggregate RTLV1 and the aggregate RLTV2. The processor 201B in FIG. 2 may be used for this calculation.

At step 106, an aggregate Potential Life Time Value ("PLTV") estimate, referred to as an "aggregate PLTV" in step 106 of FIG. 1, may be calculated from preselected products that are not in the current product mix of the first consumer chosen in step 102. The processor 201B in FIG. 2 may be used for this calculation. The preselected products may include any product offered by the organization which the first consumer chosen in step 102 does not have in that consumer's current product mix. In a preferred embodiment, the preselected products may be a group of products (e.g., "demand deposit account") rather than individual types of demand deposit accounts (e.g., interest-bearing accounts, free checking, etc.). The calculation of the PLTV estimates will be discussed further below with respect to FIG. 3.

At step 107, a decision is made as to whether there are further consumers in the database for whom the RLTV1, RLTV2, RLTV3, and PLTV estimates need to be calculated. If so, a second consumer is selected and steps 103 through 106 are repeated for the pertinent information in the database related to the second consumer. Steps 103-106 are looped through in a similar manner for each consumer in the database. Once the RLTV1, RLTV2, RLTV3, and PLTV estimates are calculated for each consumer in the database, flow is directed to step 108.

At step 108, a distribution of the aggregate RLTV3 for each consumer in the database is analyzed. At step 109, a distribution of the aggregate PLTV for each consumer in the database is analyzed. The processor 201B in FIG. 2 may be used for these analyses. These analyses will be discussed further with reference to FIGS. 4-8 below.

For step 110, simply for ease of explanation and without limiting the disclosure in any way, the first consumer will be chosen for this discussion. At step 110, the first consumer may be evaluated based on the distribution of the aggregate RLTV3s and the aggregate PLTVs. The result of this evaluation may be used to direct an interaction with the first consumer (or a cluster of consumers of which the first consumer is a member) as discussed herein.

Optionally, in some embodiments, step 111 may be included where a matrix may be determined from the distribution of the aggregate RLTV3s and the aggregate PLTVs. The matrix will be discussed further with reference to FIGS. 4-8 below.

In other embodiments, the matrix may be determined and the evaluation of the consumer may be based on the consumer's placement in the matrix. For example, after the analysis in step 109, a matrix may then be determined from the distribution of the aggregate RLTV3s and the aggregate PLTVs, as shown in step 112. Then, in step 113, the first consumer may be evaluated based on the placement of the first consumer in the matrix, as discussed further below in relation to FIGS. 4-8. The result of this evaluation may be used to direct an interaction with the first consumer (or a cluster of consumers of which the first consumer is a member) as discussed herein.

Figure 2:
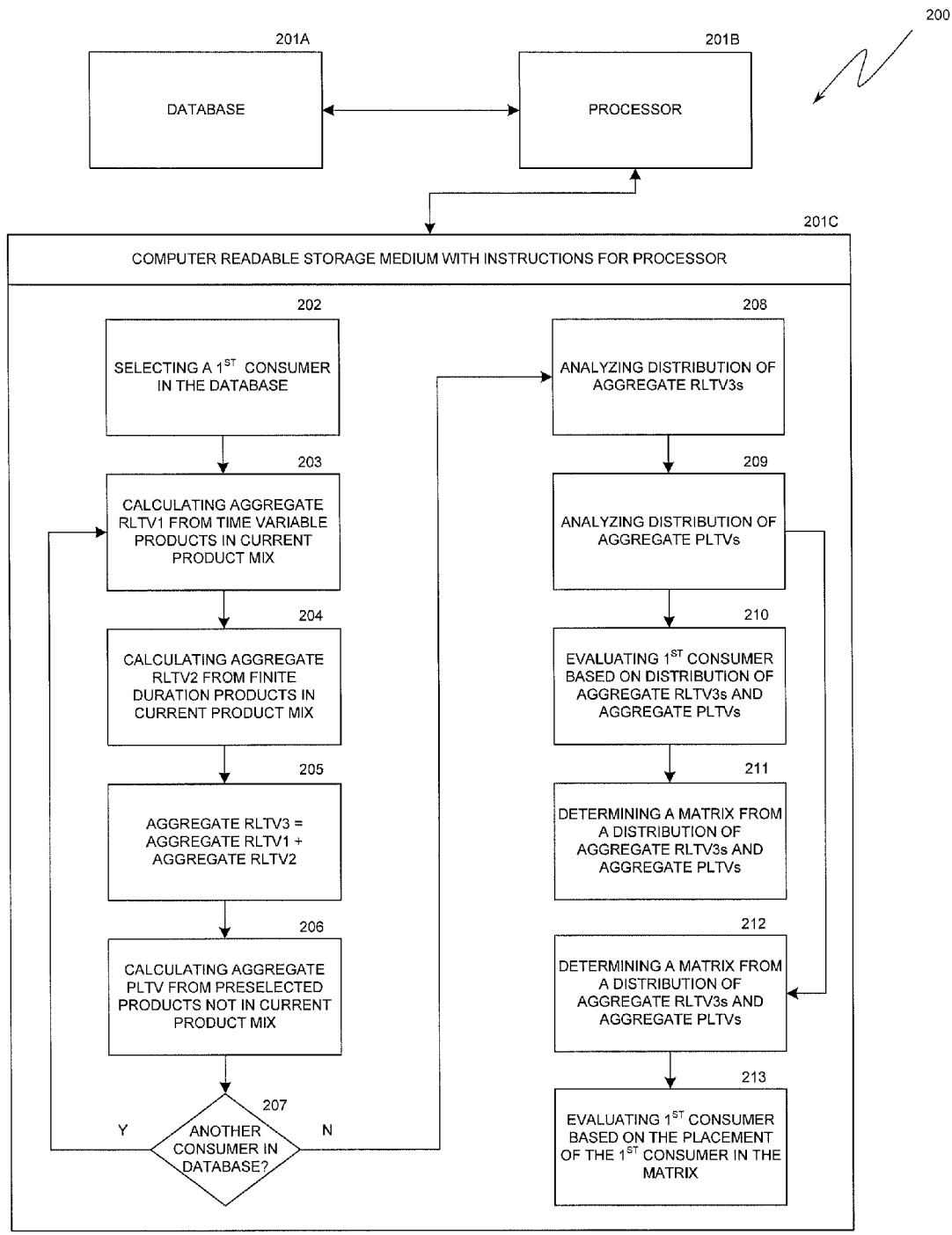
FIG. 2 is a system diagram for a system for evaluating/strategizing interactions with a client base according to an embodiment of the disclosure.

With attention now directed toward FIG. 2, a system diagram 200 for a system for strategizing interactions with a client base according to an embodiment of the disclosure is presented. Database 201A processor 201B, each as discussed above, are communicatively connected so as to exchange information between the two devices. Computer readable storage medium 201C is communicatively connected to the processor 201B. Blocks 202-211 in the computer readable storage medium 201C are similar to steps 102-111 in FIG. 1. Computer readable storage medium 201C has stored thereon computer-executable instructions which, when executed, cause the processor to: selecting a first consumer from the database at block 202; calculate an aggregate first Residual Life Time Value ("RLTV") estimate from the time variable products in the current product mix for the first consumer at block 203; calculate an aggregate second RLTV estimate from the finite duration products in the current product mix for the first consumer at block 204; calculate an aggregate third RLTV estimate from the aggregate first RLTV estimate and from the aggregate second RLTV estimate at block 205; and calculate an aggregate PLTV estimate from preselected products not in the current product mix for the first consumer at block 206. The instructions, when executed, also cause the processor to determine if there are further consumers in the database for whom the RLTV1, RLTV2, RLTV3, and PLTV estimates need to be calculated at block 207. If so, a second consumer is selected and blocks 203 through 206 are repeated for the pertinent information in the database related to the second consumer. Blocks 203-206 are looped through in a similar manner for each consumer in the database. Once the RLTV1, RLTV2, RLTV3, and PLTV estimates are calculated for each consumer in the database, flow is directed to block 208. Additionally, the instructions, when executed, cause the processor to: analyze a distribution of the aggregate third RLTV estimates for the plural consumers at block 208; analyze a distribution of the aggregate PLTV estimates for the plural consumers at block 209; and evaluate the first consumer as a function of the distribution of the third aggregate RLTV estimates and as a function of the distribution of the aggregate PLTV estimates at block 210. Optionally, in some embodiments, the instructions, when executed, may determine a matrix may from the distribution of the aggregate RLTV3s and the aggregate PLTVs at block 211.

In other embodiments, the matrix may be determined and the evaluation of the consumer may be based on the consumer's placement in the matrix. For example, after the analysis in step 209, a matrix may then be determined from the distribution of the aggregate RLTV3s and the aggregate PLTVs, as shown in step 212. Then, in step 213, the first consumer may be evaluated based on the placement of the first consumer in the matrix, as discussed further below in relation to FIGS. 4-8. The result of this evaluation may be used to direct an interaction with the first consumer (or a cluster of consumers of which the first consumer is a member) as discussed herein.

Considering FIGS. 3A through 3E, these figures constitute a flow diagram 300A through 300E of a detailed method of strategizing interactions with a client base according to an embodiment of the disclosure. Regarding FIG. 3A, at step 301 a database may be provided similar to the database discussed above for step 101 in FIG. 1. At step 302, a time variable product (as discussed above) may be selected. The time variable product is in a current product mix of a consumer in the database who, for the purpose of ease of understanding this discussion, will be initially identified as the first consumer. This identification in no way is meant to impose any limitations on the breadth of the disclosure.

Figure 9:
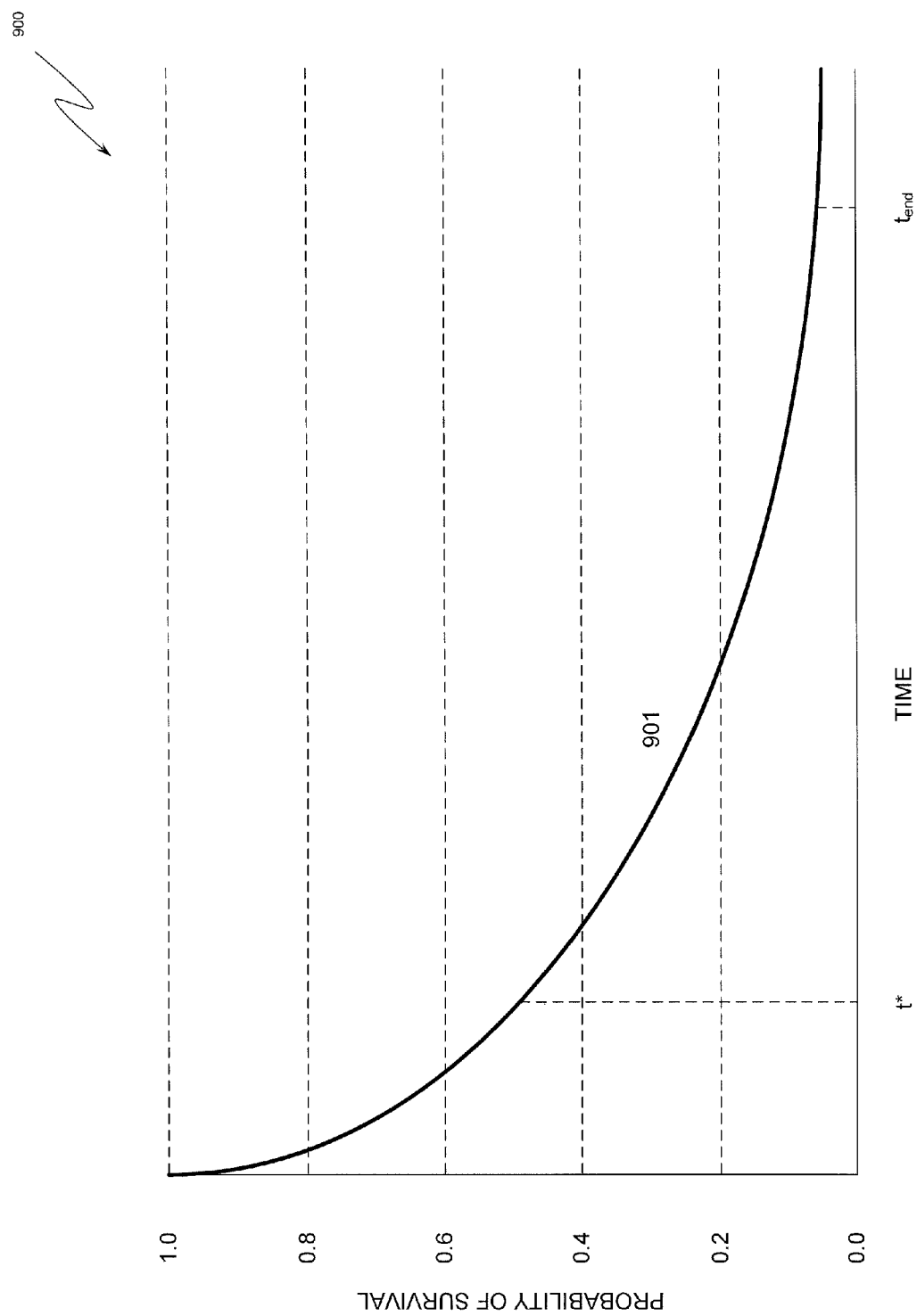
FIG. 9 is a graph showing an exemplary baseline product survival curve according to an embodiment of the disclosure.

At step 303, a baseline product survival curve, as is known in the art such as when using the Kaplan-Meier method, may be determined for the selected time variable product for the first consumer. In an embodiment, the equation for the baseline product survival curve, which is a function of time, is determined as well as the time at which the probability of survival to the next time period is equal to a predetermined value, such as 0.05 (i.e., there is a 1 in 20 probability of survival). An exemplary product survival curve is shown in graph 900 as curve 901 in FIG. 9, where the x-axis is time and the y-axis is probability of survival. The area under the curve 901 which is to the left of time=$t^*$ (where $t^*$ is a predefined time and may be the present time) represents value of the product that has already been realized. The area under the curve 901 which is to the right of time=$t^*$ represents value of the product yet to be realized. In preferred embodiments, the area under the curve to the right of time=$t^*$ is cut off at $t_{end}$ where $t_{end}$ may be defined to be the point in time where the probability of incremental survival reaches some predetermined value, such as 0.05.

Figure 10:
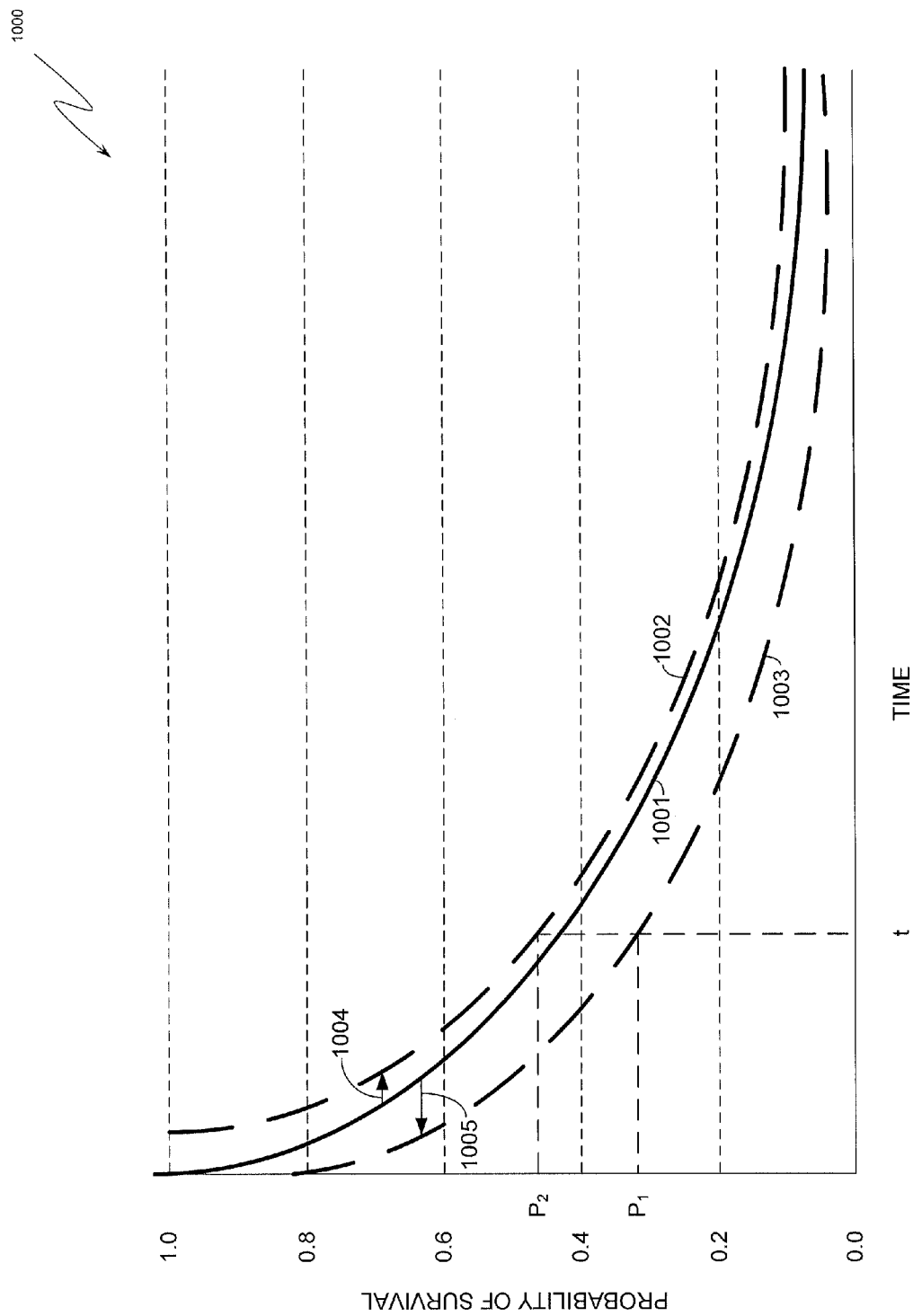
FIG. 10 is a graph showing an exemplary baseline product survival curve, an exemplary first consumer product survival curve which is a right shifted from the exemplary product survival curve, and an exemplary second consumer product survival curve which is left shifted from the exemplary product survival curve.

Again with reference to FIG. 3A, at step 304, a consumer product survival curve may be determined for the selected time variable product for the first consumer. The consumer product survival curve may be determined using the Cox Proportional Hazard modeling technique, as is known in the art. This technique may be used to determine the product's survival "expansion" or "contraction" relative to the baseline product survival curve. As is known in the art, the Cox Proportional Hazard modeling technique is a regression method which takes into account the individual consumer's unique set of demographic characteristics and/or socio-economic characteristics. Thus, the consumer product survival curve is consumer-specific rather than a "one size fits all" approach. Graph 1000 in FIG. 10 is generally illustrative of the Cox Proportional Hazard modeling technique. An exemplary baseline product survival curve 1001 is shown which may be shifted (arrow 1004) to the right ("expanded") to form a first consumer product survival curve 1002. As stated above, this expansion of the products survival is based at least in part on the consumer's demographic and/or socio-economic characteristics. Similarly, also shown in graph 1000 is a shift (arrow 1005) of the baseline product survival curve 1001 to the left ("contracted") to form a second consumer product survival curve 1003. As can be seen from graph 1000, at time=t, the probability of survival according to the baseline product survival curve is approximately 0.43, while the "expanded" consumer product survival curve 1002 has a probability of survival of approximately 0.46 and the "contracted" consumer product survival curve 1003 has a probability of survival of approximately 0.32.

Returning attention to FIG. 3A, at step 305, the area under the consumer product survival curve for the selected time variable product for the first consumer may be calculated. Similarly as discussed above with respect to FIG. 9, the area under the consumer product survival curve to be calculated is between a predetermined t* and a predetermined $t_{end}$. This area may be calculated by any known means, such as by use of integrals or using trapezoidal summation approximation, as is known in the art. Calculating the area under the curve to the right of t* eliminates the financial gains delivered to the organization prior to t* (which may be the current point in time).

At step 306, an estimated potential residual profit may be calculated to determine the RLTV estimate for the selected time variable product for the first consumer (referred to as "RLTV1" in step 306). The potential residual profit may be calculated using values that may include: the residual life time area under the consumer product survival curve (as determined in step 305); a client-specific average 12-month balance for the product (or some other convenient average balance); an estimated profit per dollar deposited, for example; the consumer's age (which may be an actuarial life expectancy); and a retail segment (e.g., a stratification group) to which the first consumer belongs. Additionally, a net present value for the selected product using an appropriate discount factor, as is known in the art, may be included in the calculation.

At step 307, a determination is made as to whether there are additional time variable products in the current product mix for the first consumer. If so, then another time variable product is selected and steps 303-306 are repeated for the newly-selected time variable product. Steps 303-306 are looped through in a similar manner for each time variable product in the first consumer's current product mix. Once the RLTV1 estimates are calculated for each time variable product in the first consumer's current product mix, flow is directed to step 308.

At step 308, an aggregate RLTV1 for the first consumer is determined. The aggregate RLTV1 may be the summation of the RLTV1 estimates determined in step 306 for each time variable product in the current product mix for the first consumer.

At step 309, a decision is made as to whether there are further consumers in the database for whom the aggregate RLTV1 estimates need to be determined. If so, a second consumer is selected and steps 302 through 308 are repeated (including, as necessary, loops for steps 303-306) for the pertinent information in the database related to the second consumer. Steps 302-308 are looped through in a similar manner for each consumer in the database. Once the aggregate RLTV1 estimates are determined for each consumer in the database, flow is directed to step 310 in FIG. 3B.

Figure 3A:
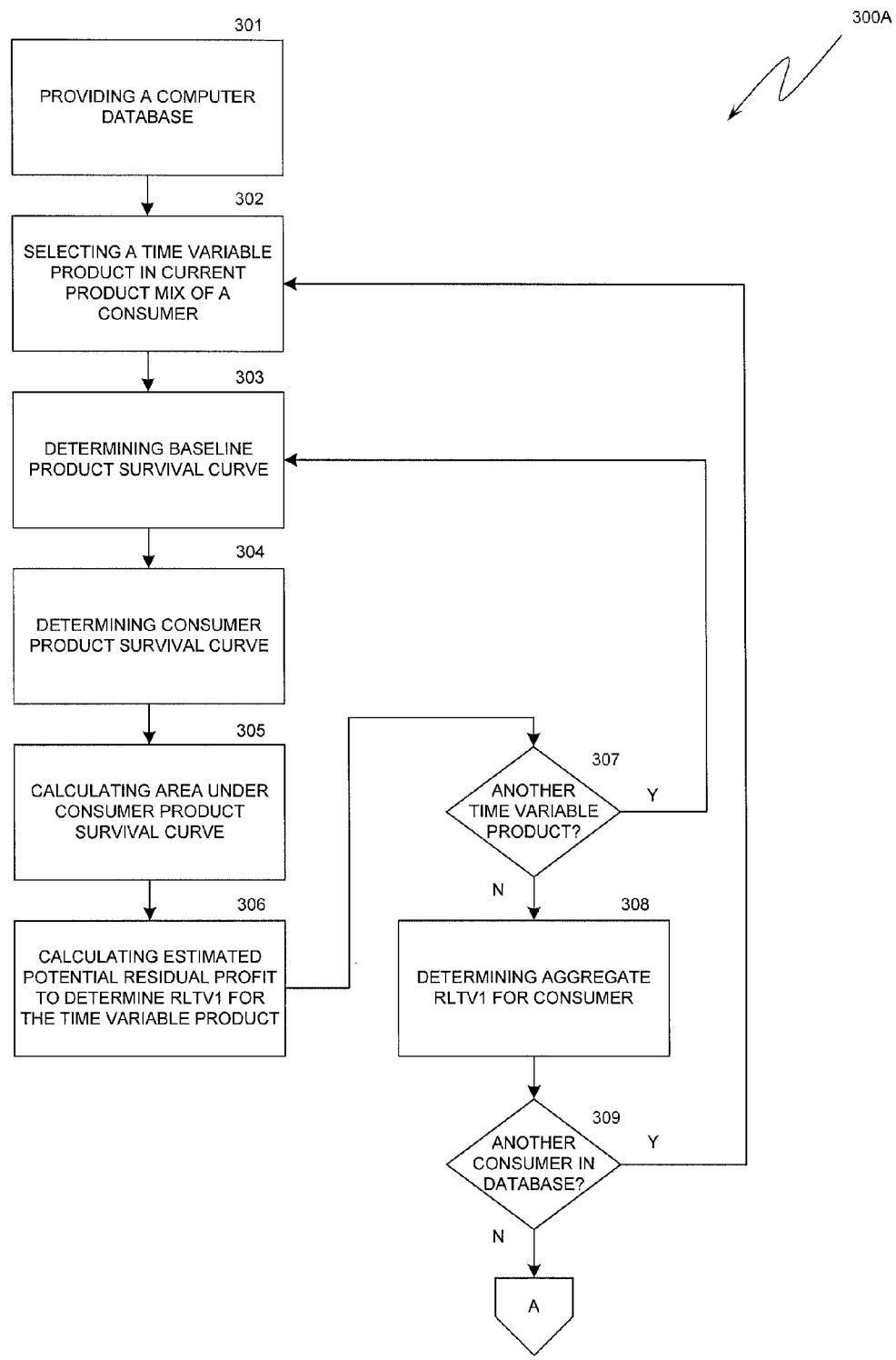
FIGS. 3A through 3E constitute a flow diagram of a detailed method of evaluating/strategizing interactions with a client base according to an embodiment of the disclosure.
Figure 3B:
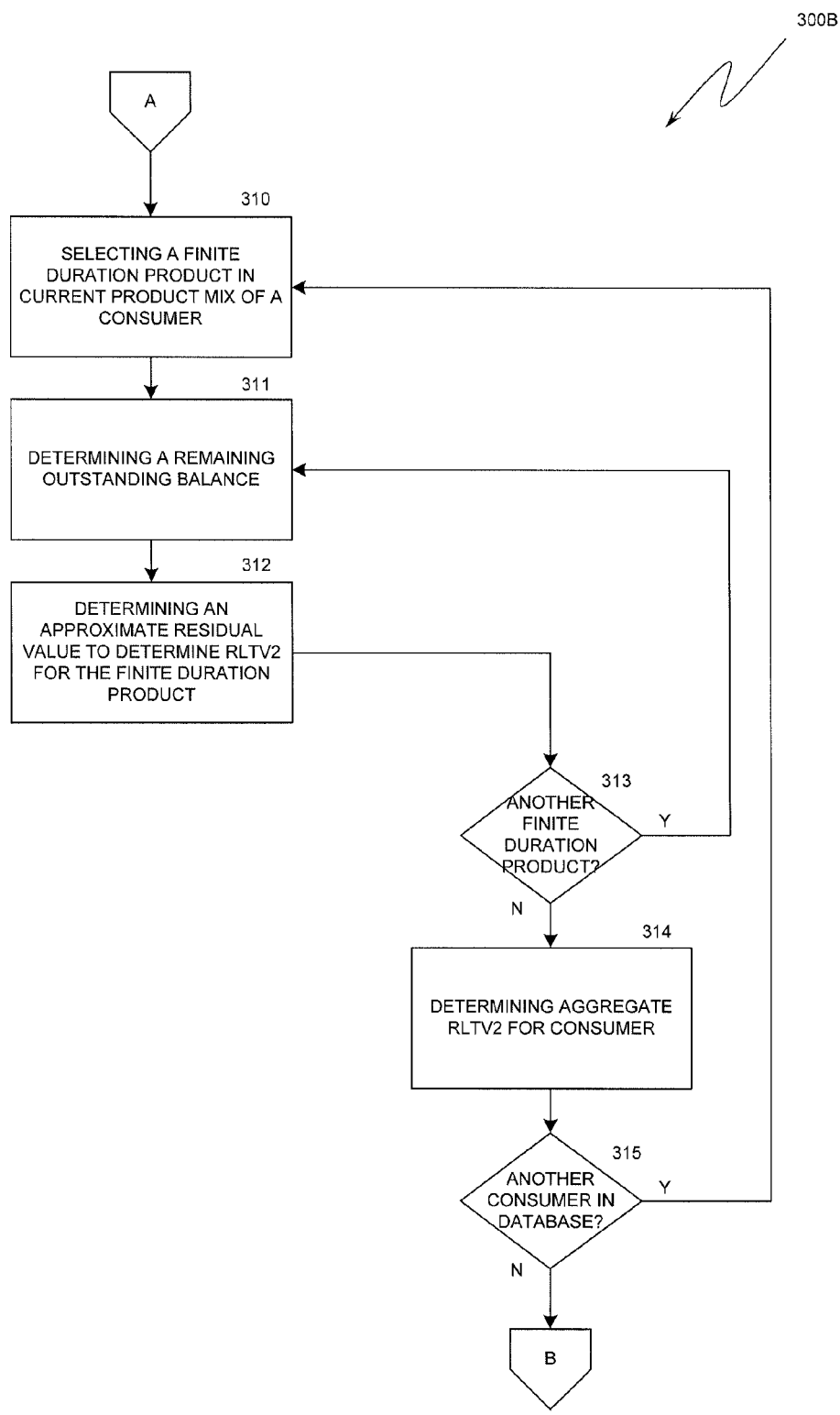

Regarding FIG. 3B, at step 310, a finite duration product/service (as discussed above) may be selected. The finite duration product is in a current product mix of a consumer in the database who, for the purpose of ease of understanding this discussion, will be initially identified as the first consumer. This identification in no way is meant to impose any limitations on the breadth of the disclosure.

At step 311, an outstanding balance for the selected finite duration product is determined. At step 312, an approximate residual value may be determined to thereby determine an RLTV estimate for the selected finite duration product for the first consumer (referred to as "RLTV2" in step 311). The RLTV2 estimate may be obtained, for example, by multiplying the outstanding balance (i.e., the current dollar obligation) by that particular product's FTP (i.e., funds transfer pricing) rate.

At step 313, a determination is made as to whether there are additional finite duration products in the current product mix for the first consumer. If so, then another finite duration product is selected and steps 311-312 are repeated for the newly-selected finite duration product. Steps 311-312 are looped through in a similar manner for each finite duration product in the first consumer's current product mix. Once the RLTV2 estimates are calculated for each finite duration product in the first consumer's current product mix, flow is directed to step 314.

At step 314, an aggregate RLTV2 for the first consumer is determined. The aggregate RLTV2 may be the summation of the RLTV2 estimates determined in step 312 for each finite duration product in the current product mix for the first consumer.

At step 315, a decision is made as to whether there are further consumers in the database for whom the aggregate RLTV2 estimates need to be determined. If so, a second consumer is selected and steps 310 through 314 are repeated (including, as necessary, loops for steps 311-312) for the pertinent information in the database related to the second consumer. Steps 310-314 are looped through in a similar manner for each consumer in the database. Once the aggregate RLTV2 estimates are determined for each consumer in the database, flow is directed to step 316 in FIG. 3C.

Figure 3C:
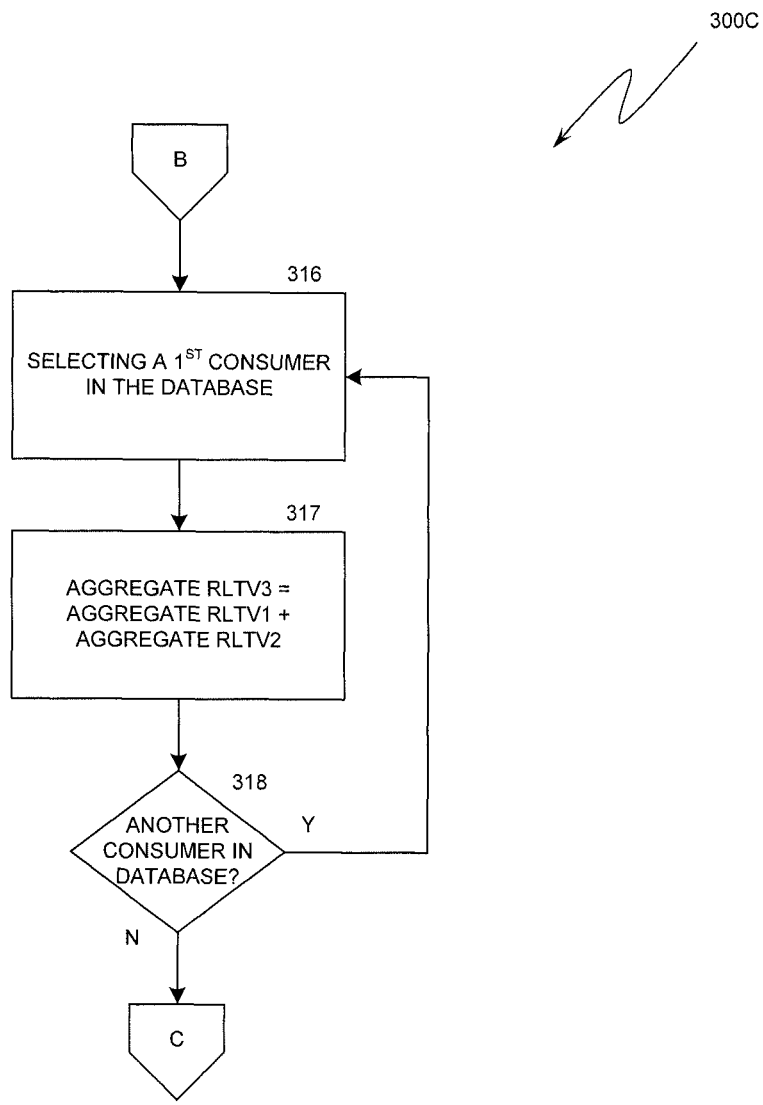

Referring now to FIG. 3C, at step 316, a consumer may be selected from the database. The selected consumer will be initially identified as the first consumer for the purpose of ease of understanding this discussion. This identification in no way is meant to impose any limitations on the breadth of the disclosure.

At step 317, a third aggregate RLTV estimate for the first consumer may be determined (referred to as "aggregate RLTV3" in step 317) from, for example, the summation of the aggregate RLTV1 and the aggregate RLTV2 estimates determined above for the first consumer.

At step 318, a decision is made as to whether there are further consumers in the database for whom the aggregate RLTV3 estimates need to be determined. If so, a second consumer is selected and steps 316 through 317 are repeated for the pertinent information in the database related to the second consumer. Steps 316-317 are looped through in a similar manner for each consumer in the database. Once the aggregate RLTV3 estimates are determined for each consumer in the database, flow is directed to step 319 in FIG. 3D.

Figure 3D:
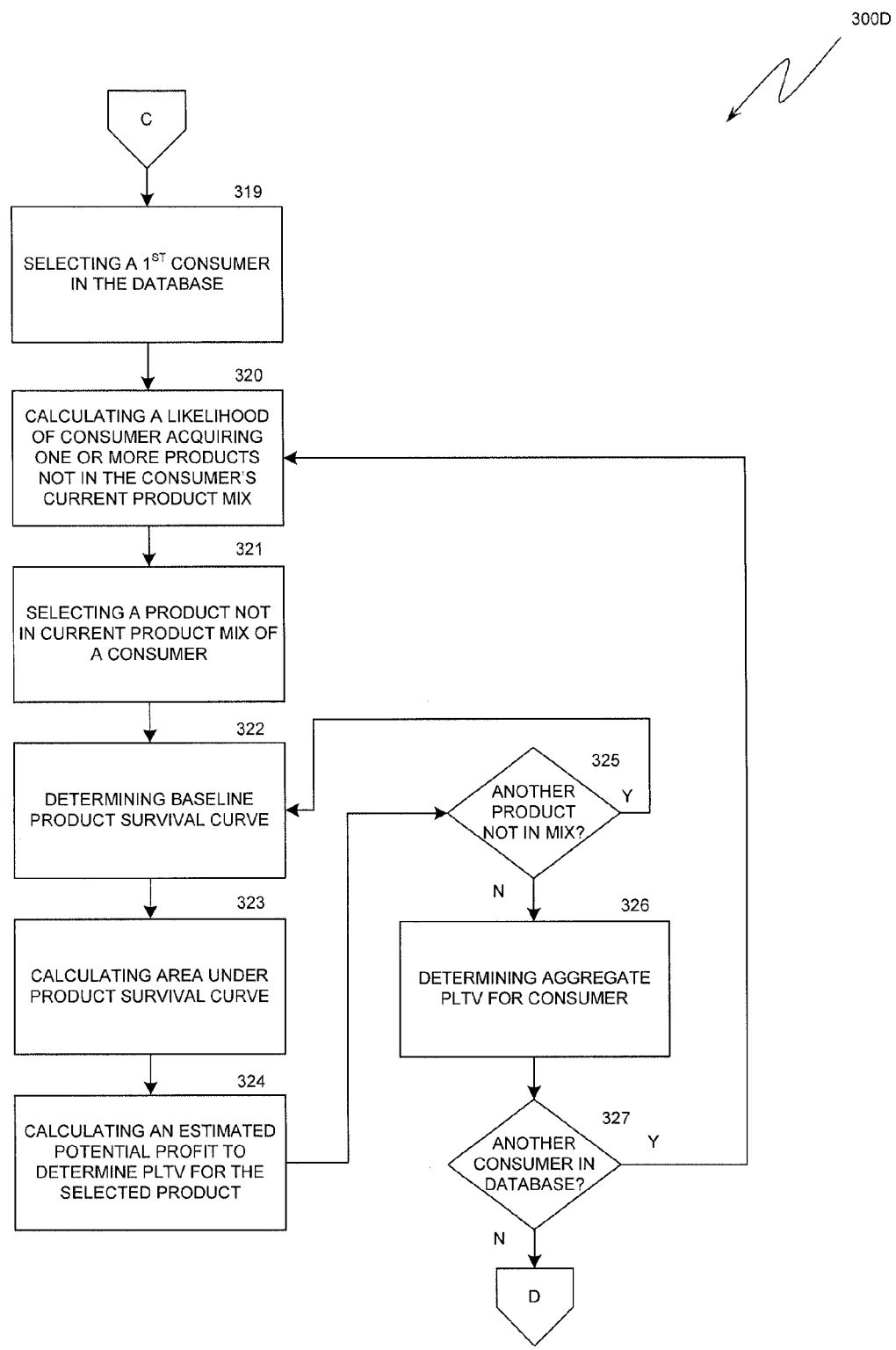

Regarding FIG. 3D, at step 319, a first consumer in the database is selected where again, as above, the nomenclature "first consumer" is used here for convenience only and imposes no limitations to the breadth of the disclosure. At step 320, a likelihood of the first consumer to acquire one or more products that are not in the current product mix of the first consumer is calculated. This calculation may entail utilizing logistic regression methodologies, as are known in the art, and may further entail conditional probabilities, as are known in the art, to ascertain the likelihood of this specific client acquiring a specific product/service given this specific client's current product mix as well as this specific client's demographic characteristics and/or socio-economic characteristics.

At step 321, a product/service that is not in a current product mix of the first consumer is selected. At step 322, a baseline product survival curve, as discussed above, may be determined for the selected product for the first consumer. At step 323, the area under the baseline product survival curve for the selected product for the first consumer may be calculated. The area is taken from the initial point of future enrollment (which may be an estimate or an assumed time) through to the predetermined terminal point (e.g., $t_{end}$ in FIG. 9). At step 324, an estimated potential profit may be calculated to determine the PLTV estimate for the selected product for the first consumer (referred to as "PLTV" in step 324). The PLTV represents the expected lifetime value of the selected product.

At step 325, a determination is made as to whether there are additional products not in the current product mix for the first consumer. If so, then another product not in the current product mix of the first consumer is selected and steps 322-324 are repeated for the newly-selected product. Steps 322-324 are looped through in a similar manner for each selected product that is not in the first consumer's current product mix. Once the PLTV estimates are calculated for each selected product not in the first consumer's current product mix, flow is directed to step 326.

At step 326, an aggregate PLTV for the first consumer is determined. The aggregate PLTV may be the summation of the PLTV estimates determined in step 324 for each selected product not in the current product mix for the first consumer.

At step 327, a decision is made as to whether there are further consumers in the database for whom the aggregate PLTV estimates need to be determined. If so, a second consumer is selected and steps 320 through 326 are repeated (including, as necessary, loops for steps 322-324) for the pertinent information in the database related to the second consumer. Steps 320-326 are looped through in a similar manner for each consumer in the database. Once the aggregate PLTV estimates are determined for each consumer in the database, flow is directed to step 328 in FIG. 3E.

Figure 3E:
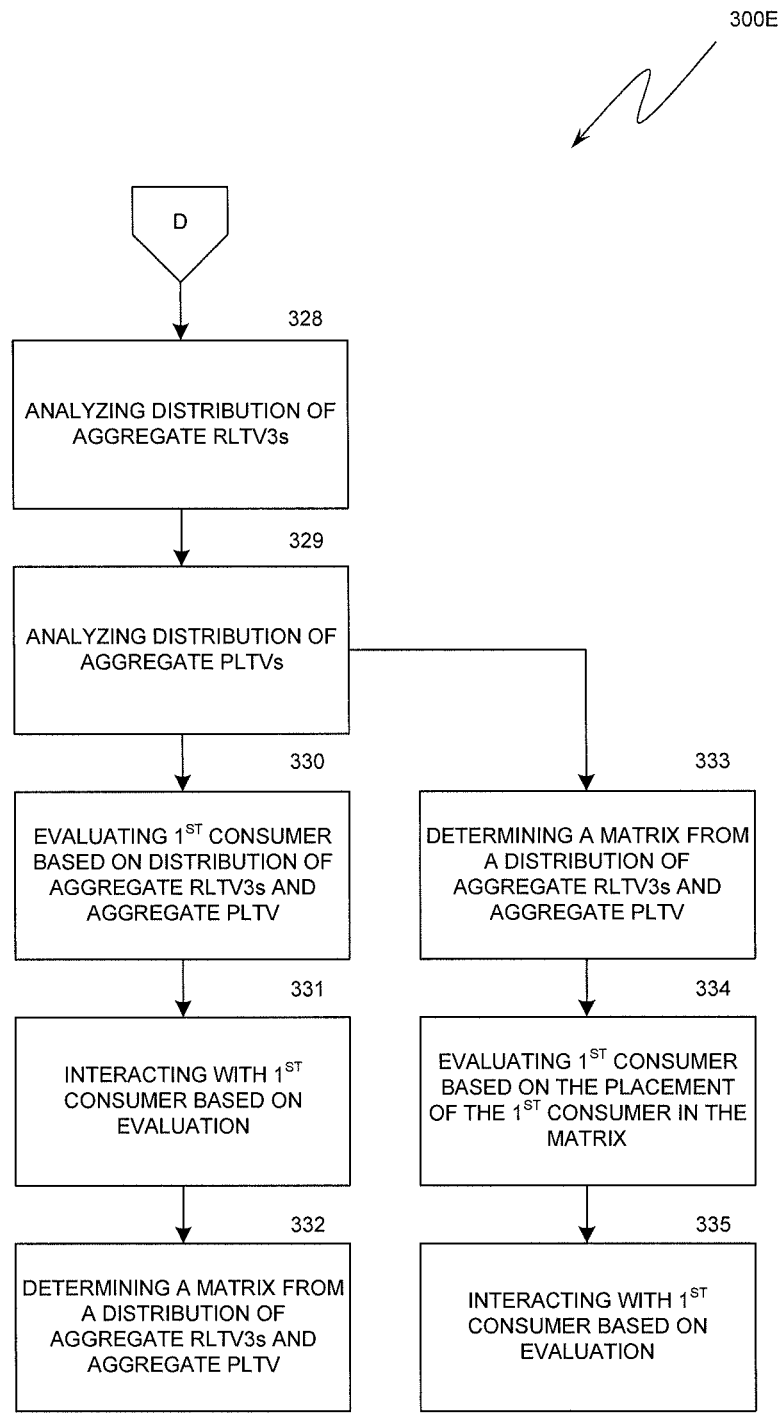

Referring now to FIG. 3E, at step 328, a distribution of the aggregate RLTV3 for each consumer in the database is analyzed. At step 329, a distribution of the aggregate PLTV for each consumer in the database is analyzed. The processor 201B in FIG. 2 may be used for these analyses. These analyses will be discussed further with reference to FIGS. 4-8 below.

For step 330, simply for ease of explanation and without limiting the disclosure in any way, the first consumer will be chosen for this discussion. At step 330, the first consumer is evaluated based on the distribution of the aggregate RLTV3s and the aggregate PLTVs. At step 331, the result of the evaluation in step 330 may be used to direct an interaction with the first consumer (or a cluster of consumers of which the first consumer is a member) as discussed herein and/or the evaluation may entail a hierarchical ranking of the consumers in the database or the determination of a clustering of the consumers in the database.

Optionally, in some embodiments, step 332 may be included where a matrix may be determined from the distribution of the aggregate RLTV3s and the aggregate PLTVs. The matrix will be discussed further with reference to FIGS. 4-8 below.

In other embodiments, the matrix may be determined and the evaluation of the consumer may be based on the consumer's placement in the matrix and the result of that evaluation may be used to direct an interaction with the consumer, as discussed above. For example, after the analysis in step 329, a matrix may then be determined from the distribution of the aggregate RLTV3s and the aggregate PLTVs, as shown in step 333. Then, in step 334, the first consumer may be evaluated based on the placement of the first consumer in the matrix, as discussed further below in relation to FIGS. 4-8. In step 335, the result of this evaluation may be used to direct an interaction with the first consumer (or a cluster of consumers of which the first consumer is a member).

Figure 4:
FIG. 4 is a depiction of an exemplary matrix of Residual Life Time Value ("RLTV") estimates and Potential Life Time Value ("PLTV") estimates showing quartiles with exemplary general descriptions of consumers' life time value according to an embodiment of the disclosure.

With attention now directed to FIG. 4, the matrix 400 is a depiction of an exemplary matrix of Residual Life Time Value ("RLTV") estimates and Potential Life Time Value ("PLTV") estimates showing quartiles with exemplary general descriptions of consumers' life time value according to an embodiment of the disclosure. As can be seen from the matrix 400, RLTV values increase along the horizontal axis and represent a consumer's likely residual value on products/services currently held. PLTV values increase along the vertical axis and represent a consumer's potential lifetime value of products/services not yet held by the consumer but have a cumulative likelihood of being acquired given the consumer's current product mix of products/services. As discussed above, for example, with respect to FIGS. 1 (at step 111) and 3E (at step 332), the matrix may be determined from the distribution of the aggregate RLTV3s and PLTVs for each of the consumers in the database. The aggregate RLTV3s may be divided into quartiles of statistical distribution, as shown in matrix 400 of FIG. 4. Likewise, the aggregate PLTVs may be divided into quartiles of statistical distribution as shown. It shall be understood by those of skill in the art that other statistical distribution schemes, such as deciles or other useful quantile schemes, may be implemented instead of quartiles. In some embodiments, the evaluation of the consumer may be determined based on the consumer's placement in the matrix.

The cluster represented by the block designated 401 in matrix 400 represents a cluster with low current value (i.e., between the $0^{th}$ and $25^{th}$ percentile of RLTV values) and low potential value (i.e., between the $0^{th}$ and $25^{th}$ percentile of PLTV values). Similarly, the cluster represented by the block designated 402 in matrix 400 represents a cluster with low current value (i.e., between the $0^{th}$ and $25^{th}$ percentile of RLTV values) and high potential value (i.e., between the $75^{th}$ and $100^{th}$ percentile of PLTV values). Likewise, the cluster represented by the block designated 403 in matrix 400 represents a cluster with high current value (i.e., between the $75^{th}$ and $100^{th}$ percentile of RLTV values) and low potential value (i.e., between the $0^{th}$ and $25^{th}$ percentile of PLTV values). Correspondingly, the cluster represented by the block designated 404 in matrix 400 represents a cluster with high current value (i.e., between the $75^{th}$ and $100^{th}$ percentile of RLTV values) and high potential value (i.e., between the $75^{th}$ and $100^{th}$ percentile of PLTV values). Comparably, the cluster represented by the block designated 405 in matrix 400 represents a cluster with moderately low current value (i.e., between the $25^{th}$ and $50^{th}$ percentile of RLTV values) and moderately high potential value (i.e., between the 50$^{th}$ (median) and 75$^{th}$ percentile of PLTV values). These clusters, as discussed below with respect to FIG. 5, may be useful in directing future interactions by the organization with a consumer that is currently placed within a particular cluster.

Figure 5:
FIG. 5 is a depiction of an exemplary matrix of Residual Life Time Value ("RLTV") estimates and Potential Life Time Value ("PLTV") estimates indicating exemplary interaction directions for one or more consumers' life time value according to an embodiment of the disclosure.

Referring now to FIG. 5, the matrix 500 is a depiction of an exemplary matrix of Residual Life Time Value ("RLTV") estimates and Potential Life Time Value ("PLTV") estimates indicating exemplary interaction directions for one or more consumers' life time value according to an embodiment of the disclosure. The matrix 500 is divided into quartiles similar to the matrix 400 in FIG. 4. Of course, the matrix 500 could be divided into any useful quantile scheme. The individual clusters in matrix 500 include exemplary strategies that may be employed by an organization when interacting with a particular consumer or a similarly-situated group of consumers. Exemplary strategies in certain embodiments may include: attrition abatement ("AA"); cross-sell ("CS"); unrestricted sales potential ("S"); up-sell ("US"); standard consumer servicing ("SRVC"); and optimize consumer servicing ("MAX SRVC"). Those of skill in the art will understand that the above-listed strategies are not all-encompassing and that other strategies may be employed by an organization. Furthermore, an organization may come to understand over time that interactions with certain clusters of consumers may change over time and the organization may replace a current strategy with another, more effective, strategy.

For example, in the block designated 501 in matrix 500, which may correlate to block 401 in matrix 400, consumers with RLTV and PLTV values that place them in this cluster typically will have a low current value and a low potential value. The organization's strategy for dealing with consumers in block 501 may be "SRVC", i.e., provide standard consumer servicing. Therefore, for example, if the methodology in FIGS. 3A-3E is followed and a matrix is determined, such as in step 332 (which, as discussed above, may precede steps 330 and 331) and the evaluation of a particular consumer places that consumer in the matrix within block 501, the organization may then be directed to interacting with that consumer by providing that consumer with standard consumer servicing.

Similarly, if the evaluation of a particular consumer places that consumer in the matrix within block 502 (which may correspond to low current value and high potential value as shown in block 402), the organization may then be directed to interacting with that particular consumer by taking an attrition abatement strategy (e.g., attempting to prevent the organization from losing the consumer) and/or assume an approach of unrestricted selling to the consumer (e.g., to build that consumer's relationship/loyalty with the organization).

Likewise, if the evaluation of a particular consumer places that consumer in the matrix within block 503 (which may correspond to high current value and low potential value as shown in block 403), the organization may then be directed to interacting with that particular consumer by taking a maximum service approach (e.g., optimizing consumer servicing to prevent the organization from losing the consumer) and/or assume an approach of up-selling to the consumer (e.g., attempting to replace one or more of the consumer's current products/services with products/services of greater marginal profitability).

Correspondingly, if the evaluation of a particular consumer places that consumer in the matrix within block 504 (which may correspond to high current value and high potential value as shown in block 404), the organization may then be directed to interacting with that particular consumer by taking an attrition abatement approach, and/or a cross-sell approach (e.g., present/sell product/service complements), and/or an up-selling approach.

Comparably, if the evaluation of a particular consumer places that consumer in the matrix within block 505 (which may correspond to moderately low current value and moderately high potential value as shown in block 405), the organization may then be directed to interacting with that particular consumer by taking a cross-selling approach and/or adopting an unrestricted selling strategy.

Figure 6:
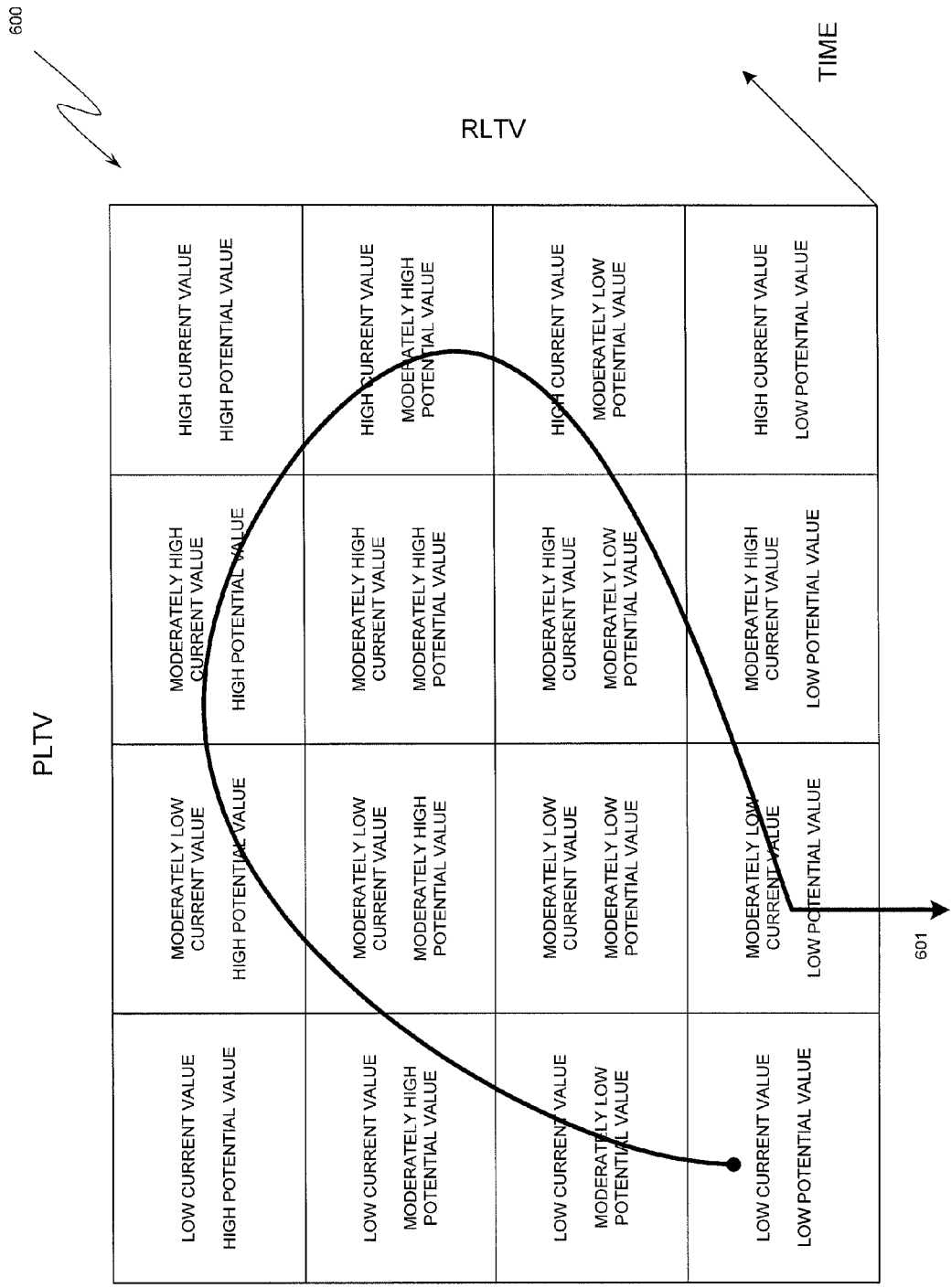
FIG. 6 is a depiction of an exemplary matrix of Residual Life Time Value ("RLTV") estimates and Potential Life Time Value ("PLTV") estimates including an exemplary path through the matrix for a hypothetical consumer based on RLTV and PLTV estimates taken at different times according to an embodiment of the disclosure.

With attention now directed towards FIG. 6, matrix 600 is a depiction of an exemplary matrix of Residual Life Time Value ("RLTV") estimates and Potential Life Time Value ("PLTV") estimates including an exemplary path 601 through the matrix for a hypothetical consumer based on RLTV and PLTV estimates taken at different times according to an embodiment of the disclosure. The details of the exemplary path 601, such as its size, shape, curvature, smoothness, slope, starting point, and ending point, are exemplary only and in no way limit the disclosed embodiments. The exemplary path 601 represents one possible path a consumer and/or similarly-situated cluster of consumers may transition through the matrix. For a particular consumer represented by the exemplary path 601, the particular consumer entered the matrix 600 in the low current value, low potential value cluster, transitioned through the matrix over time, as discussed in more detail below with respect to FIG. 8B, and left the matrix from the moderately low current value, low potential value cluster. Those of skill in the art will readily realize that there are many other possible paths a consumer may take through the matrix or that the consumer may never stray from one, or a few, boxes in the matrix. The exemplary path 601 is developed over time as will be discussed further below with respect to FIG. 8B.

Focusing now on FIG. 7, matrix 700 is a depiction of an exemplary matrix of Residual Life Time Value ("RLTV") estimates and Potential Life Time Value ("PLTV") estimates including an exemplary distribution of consumers and showing typical points of entry and typical points of attrition for one or more consumers according to an embodiment of the disclosure. As a non-limiting example, block 701 (which may correspond to block 501 and block 401) represents that 6.0% of the consumers in an organization's database (or, 6.0% of consumers in a particular stratification of an organization's database, as discussed above) are clustered in block 701 and therefore, corresponding to block 402 in matrix 400, currently have a low current value and a low potential value. Similarly, block 702 represents that 8.2% of the consumers are clustered in this block and have a low current value and a high potential value. Likewise, block 703 represents that 3.7% of the consumers are clustered in this block and have a high current value and a low potential value. Correspondingly, block 704 represents that 10.0% of the consumers are clustered in this block and have a high current value and a high potential value. Comparably, block 705 represents that 5.2% of the consumers are clustered in this block and have a moderately low current value and a moderately high potential value.

Additionally, matrix 700 shows exemplary typical points of entry of consumers into the matrix and typical points of attrition of consumers out of the matrix. As is apparent to those of skill in the art, these are typical entry/attrition points and in no way are consumers limited to entering/exiting the matrix at these points. As an example, when a consumer first purchases products/services from an organization, that consumer will typically have a low current value to the organization since the consumer typically will only purchase a few products/services from the organization. Some, or perhaps most, of these new consumers may be in the 25$^{th}$ to 75$^{th}$ percentile of potential value and therefore the primary points of entry into the matrix may be as indicated in matrix 700. In certain embodiments, typical exemplary points of attrition may be where a consumer has low or moderately low current value and low potential value. A primary point of attrition may be where a consumer has low current value and low potential value where a secondary point of attrition may be where a consumer has a moderately low current value and a low potential value. Naturally, attrition of a consumer may occur regardless of where that consumer currently is in the matrix and may be independent of that consumer's previous path through the matrix.

Figure 8A:
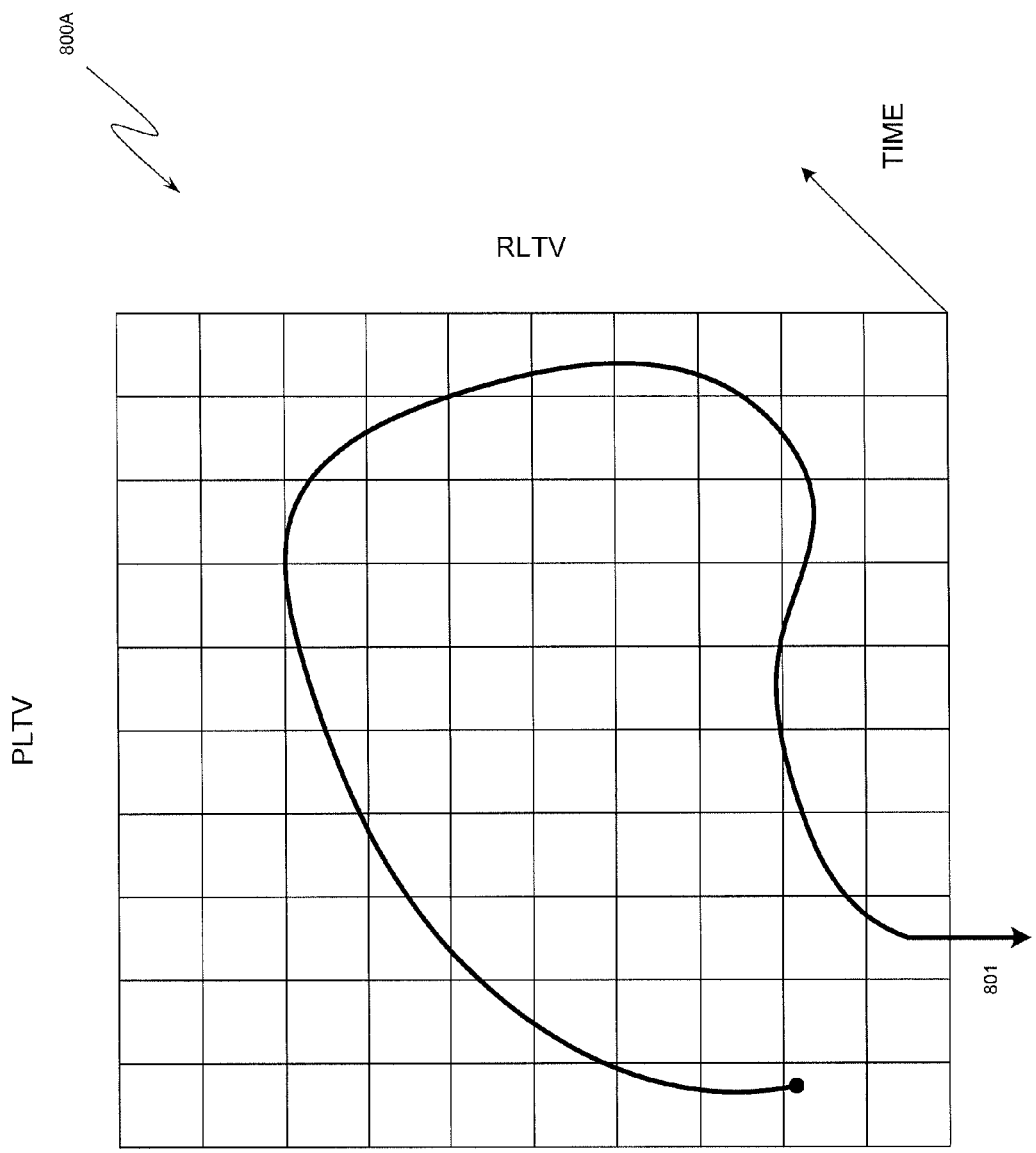
FIG. 8A is a depiction of an exemplary matrix of Residual Life Time Value ("RLTV") estimates and Potential Life Time Value ("PLTV") estimates showing deciles including an exemplary path through the matrix for a hypothetical consumer based on RLTV and PLTV estimates taken at different times according to an embodiment of the disclosure.

Referring now to FIG. 8A, the matrix 800A is a depiction of an exemplary matrix of Residual Life Time Value ("RLTV") estimates and Potential Life Time Value ("PLTV") estimates showing deciles including an exemplary path through the matrix for a hypothetical consumer based on RLTV and PLTV estimates taken at different times according to an embodiment of the disclosure. In this matrix, the clustering of the consumers is based on deciles rather than quartiles. The path 801, as with the path 601 in matrix 600, is developed over time and is one of a multitude of possible paths a consumer may take through the matrix.

Figure 8B:
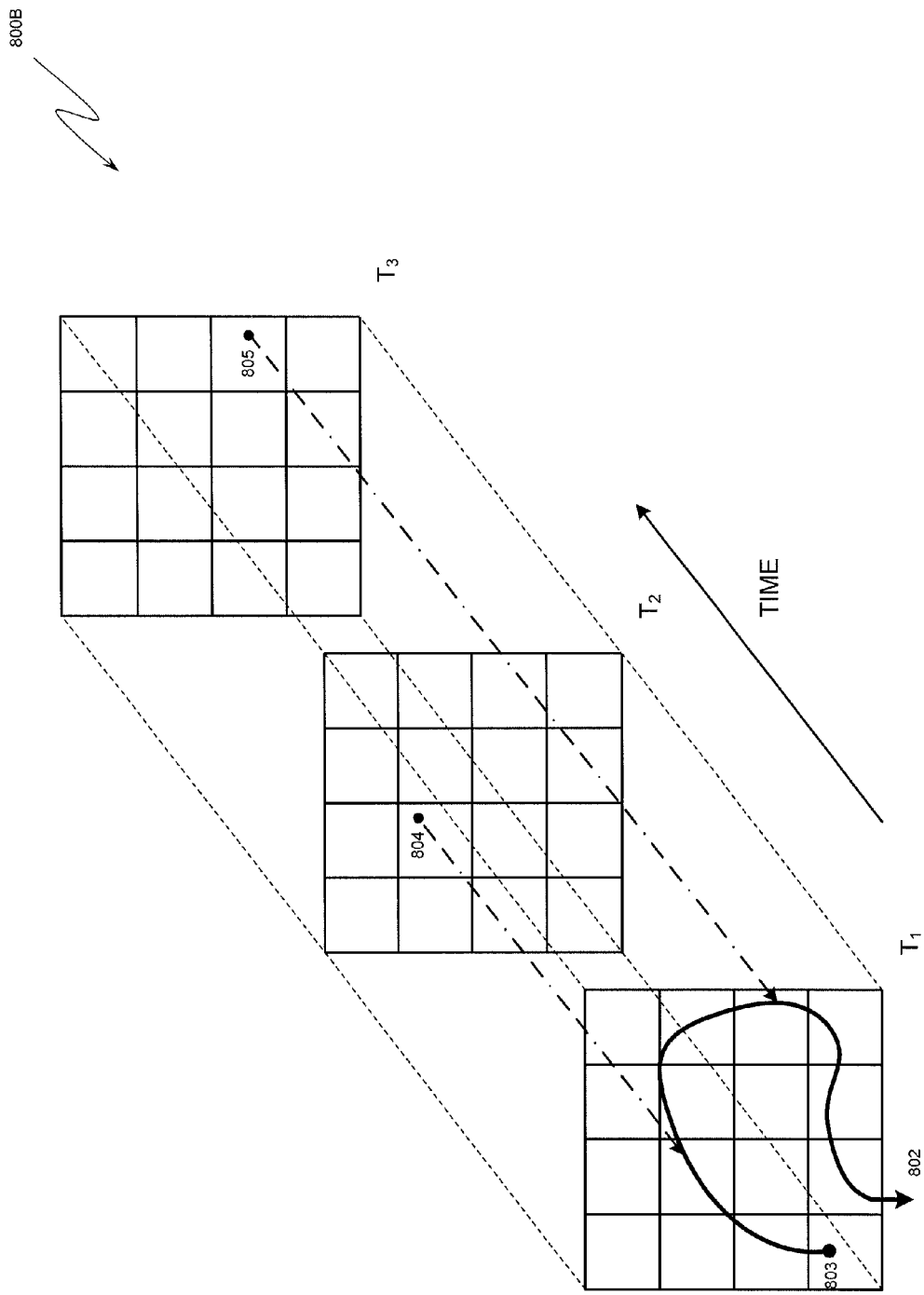
FIG. 8B is a depiction of three exemplary matrices of Residual Life Time Value ("RLTV") estimates and Potential Life Time Value ("PLTV") estimates each taken at a different time. The matrices show quartiles and have been expanded along the time axis to show a construction of an exemplary path through the matrix for a hypothetical consumer based on RLTV and PLTV estimates taken at different times according to an embodiment of the disclosure.

Turning now to FIG. 8B, depiction 800B is a representation of three exemplary matrices of Residual Life Time Value ("RLTV") estimates and Potential Life Time Value ("PLTV") estimates each taken at a different time. The matrices show quartiles and the matrices have been expanded along the time axis to show a construction of an exemplary path through the matrix for a hypothetical consumer based on RLTV and PLTV estimates taken at different times according to an embodiment of the disclosure. While for simplicity's sake only three separate matrices are shown, those of skill in the art will readily understand that many more evaluations of the hypothetical consumer may be taken to further define the exemplary path 802 through the matrix. Accordingly, the exemplary path 802 through the matrix associated with time $T_1$ may be constructed from evaluating a consumer (or similarly-situated consumers) at different points of time and tracking the consumer's evaluations at those points of time. For example, at time $T_1$, the consumer may be evaluated to be at point 803. At time $T_2$, the consumer may again be evaluated and the results of this second evaluation may place the consumer at the point 804. At time $T_3$, the consumer may yet again be evaluated and the results of this third evaluation may place the consumer at the point 805. Collapsing these evaluations into a single matrix may result in the path 802.

The times $T_1$, $T_2$, and $T_3$ may represent monthly, biweekly, quarterly, or any other convenient time interval. It is not necessary that the time intervals between evaluations remain constant. As the organization builds, for example, a monthly history of consumer clustering attributes, the organization may then use this history (e.g., the path 802) to estimate a dynamic model for consumer behaviors across time. Once this dynamic model of consumer migration through the matrix is established, the organization may then be able to customize further its future interactions with consumers, specifically with consumers similarly situated. Thus, the methodology discussed herein may be used to direct and/or refine an organization's future interaction with its consumers and/or evaluate the organization's consumer database.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those of skill in the art from a perusal hereof.

We claim:

1. A system for evaluating a first consumer, comprising:
a computer database which contains first information about plural consumers and second information about predetermined products, wherein the plural consumers include the first consumer, and wherein each of the plural consumers is associated with a current product mix comprising certain ones of the predetermined products independent of an association of another consumer with the predetermined products; and
a processor operatively connected to said database;
wherein said processor is programmed such that:
(a) for a time variable product in the current product mix for a one of the plural consumers, said processor:
   (i) determines a baseline product survival curve;
   (ii) determines a shift in the baseline product survival curve as a function of characteristics of said one consumer to thereby determine a consumer product survival curve;
   (iii) calculates an area under the consumer product survival curve;
   (iv) calculates an estimated potential residual profit from the calculated area to thereby determine a first Residual Life Time Value ("RLTV") estimate for said time variable product for said one consumer;
   (v) repeats (a)(i) through (a)(iv) for each time variable product in the current product mix for said one consumer; and
   (vi) determines an aggregate first RLTV estimate for said one consumer from the first RLTV estimate for each said time variable product for said one consumer;
and wherein said processor is programmed to repeat (a) for each one of the plural consumers;
and wherein said processor is programmed such that:
(b) for a finite duration product in the current product mix for a one of the plural consumers, said processor:
   (i) determines a remaining outstanding balance;
   (ii) multiplies the remaining outstanding balance by a funds transfer pricing value for said finite duration product to determine an approximate residual value to thereby determine a second RLTV estimate for said finite duration product for said one consumer;
   (iii) repeats (b)(i) through (b)(ii) for each finite duration product in the current product mix for said one consumer; and
   (iv) determines an aggregate second RLTV estimate for said one consumer from the second RLTV estimate for each said finite duration product for said one consumer;
and wherein said processor is programmed to repeat (b) for each one of the plural consumers, and to determine, individually for each of the plural consumers, an aggregate third RLTV estimate from that consumer's aggregate first RLTV estimate and from that consumer's aggregate second RLTV estimate;
and wherein said processor is programmed to:
(c) calculate the likelihood of a one of the plural consumers to acquire one or more of the predetermined products not in the current product mix for said one consumer; and
(d) for a preselected product not in the current product mix of a one of the plural consumers, said processor:
   (i) determines a baseline product survival curve;

(ii) calculates an area under the baseline product survival curve;
(iii) calculates an estimated potential residual profit from the calculated area to thereby determine a Potential Life Time Value ("PLTV") estimate for said preselected product for said one consumer;
(iv) repeats (d)(i) through (d)(iii) for each preselected product not in the current product mix for said one consumer; and
(v) determines an aggregate PLTV estimate for said one consumer from the PLTV estimate for each said preselected product for said one consumer;

and wherein said processor is programmed to repeat (c) and (d) for each one of the plural consumers, analyze a distribution of the aggregate third RLTV estimates for the plural consumers, analyze a distribution of the aggregate PLTV estimates for the plural consumers, and evaluate the first consumer as a function of the distribution of the third aggregate RLTV estimates and as a function of the distribution of the aggregate PLTV estimates.

2. The system of claim 1 wherein said database is stratified into plural segments according to a predetermined criteria, and wherein each of the plural consumers is assigned to one of the plural segments according to the predetermined criteria.

3. The system of claim 2 wherein the predetermined criteria comprises socio-economic information for each of the plural consumers.

4. The system of claim 3 wherein the socio-economic information comprises at least one of an income value and an age value.

5. The system of claim 2 wherein the predetermined criteria comprises historic economic behavior for each of the plural consumers.

6. The system of claim 1 wherein the time variable products comprise predetermined products that do not have a predefined termination point.

7. The system of claim 1 wherein determining the baseline product survival curve in (a)(i) includes evaluating the second information about said predetermined product for ones of the plural consumers associated with said predetermined product.

8. The system of claim 1 wherein the characteristics of the first consumer include socio-economic information.

9. The system of claim 1 wherein the finite duration products comprise predetermined products that have a predefined termination point.

10. The system of claim 1 wherein determining of a remaining outstanding balance includes determining a remaining tenure.

11. The system of claim 1 wherein the calculation of the likelihood of the first consumer to acquire one or more of the predetermined products not in the current product mix for the first consumer comprises using a discrete choice regression program.

12. The system of claim 11 wherein the calculation of the likelihood of the first consumer to acquire one or more of the predetermined products not in the current product mix for the first consumer further comprises using a conditional probability analysis.

13. The system of claim 1 wherein said processor is further programmed to determine a matrix of values from the distribution of the aggregate third RLTV estimates for the plural consumers and from the distribution of the aggregate PLTV estimates for the plural consumers.

14. The system of claim 13 wherein the matrix comprises N number of rows encompassing a first range of quantities for the distribution of the aggregate third RLTV estimates and M number of columns encompassing a second range of quantities for the distribution of the aggregate PLTV estimates thereby creating a matrix of X cells where $X=N*M$.

15. The system of claim 14 where M does not equal N.

16. The system of claim 14 wherein the first consumer is assigned to one of the X cells based at least in part on the evaluation of the first consumer.

17. The system of claim 16 wherein the evaluation of the first consumer is determined based at least in part on the cell assignment.

18. The system of claim 16 wherein the aggregate third RLTV estimate for the first consumer and the aggregate PLTV estimate for the first consumer are calculated at a first predetermined time and wherein the aggregate third RLTV estimate for the first consumer and the aggregate PLTV estimate for the first consumer are recalculated at a second predetermined time.

19. The system of claim 18 wherein the first consumer is assigned to one of the X cells based at least in part on the recalculated aggregate third RLTV estimate and the recalculated aggregate PLTV estimate.

20. The system of claim 19 wherein the evaluation of the first consumer is determined based at least in part on a difference between the cell assignment of the first consumer based at least in part on the aggregate third RLTV estimate for the first consumer and the aggregate PLTV estimate for the first consumer and the cell assignment of the first consumer based at least in part on the recalculated aggregate third RLTV estimate and the recalculated aggregate PLTV estimate.

21. The system of claim 1 wherein the first consumer comprises a cluster of consumers wherein each member of the cluster meets a predetermined criteria for inclusion in the cluster.

22. The system of claim 1 wherein the predetermined products comprise predetermined products and predetermined services.

23. The system of claim 1 wherein the current product mix includes predetermined products acquired by the consumer within a predetermined time frame.

24. The system of claim 1 wherein the current product mix includes services used by the consumer within a predetermined time frame.

25. The system of claim 1 wherein the interaction with the first consumer comprises hierarchically ranking at least the first consumer.

26. The system of claim 1 wherein the interaction with the first consumer comprises determining a clustering for the plural consumers.

* * * * *